United States Patent
Majumdar et al.

(10) Patent No.: US 11,775,431 B2
(45) Date of Patent: Oct. 3, 2023

(54) CACHE MEMORY WITH RANDOMIZED EVICTION

(71) Applicant: Micron Technology, Inc., Boise, ID (US)

(72) Inventors: Amitava Majumdar, Boise, ID (US); Sandeep Krishna Thirumala, Boise, ID (US); Lingming Yang, Meridian, ID (US); Karthik Sarpatwari, Boise, ID (US); Nevil N. Gajera, Meridian, ID (US)

(73) Assignee: Micron Technologies, Inc., Boise, ID (US)

( * ) Notice: Subject to any disclaimer, the term of this patent is extended or adjusted under 35 U.S.C. 154(b) by 0 days.

(21) Appl. No.: 17/556,891

(22) Filed: Dec. 20, 2021

(65) Prior Publication Data

US 2023/0195624 A1    Jun. 22, 2023

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01); *G06F 2212/72* (2013.01)

(58) Field of Classification Search
CPC ............. G06F 12/0802; G06F 2212/60; G06F 2212/72

See application file for complete search history.

(56) References Cited

U.S. PATENT DOCUMENTS

2017/0337136 A1    11/2017  Basu et al.
2018/0173636 A1*   6/2018   Reed ................... G06F 12/0891

OTHER PUBLICATIONS

Pursuant to MPEP § 2001.6(b) the applicant brings the following co-pending application to the Examiner's attention: U.S. Appl. No. 17/556,862.
"Non-Final Office Action", U.S. Appl. No. 17/556,862, dated Mar. 9, 2023, 21 pages.
"Notice of Allowance", U.S. Appl. No. 17/556,862, filed Jun. 23, 2023, 9 pages.

* cited by examiner

*Primary Examiner* — Jae U Yu
(74) *Attorney, Agent, or Firm* — Colby Nipper PLLC

(57) ABSTRACT

This document describes apparatuses and techniques for cache memory with randomized eviction. In various aspects, a cache memory randomly selects a cache line for eviction and/or replacement. The cache memory may also support multi-occupancy whereby the cache memory enters data reused from another cache line to replace the data of the randomly evicted cache line. By so doing, the cache memory may operate in a nondeterministic fashion, which may increase a probability of data remaining in the cache memory for subsequent requests.

31 Claims, 13 Drawing Sheets

CACHE MEMORY WITH RANDOMIZED EVICTION

BACKGROUND

To operate efficiently, some computing systems include a hierarchical memory system, which may include multiple levels of memory. Here, efficient operation can entail cost efficiency and speed efficiency. Faster memories are typically more expensive than relatively slower memories, so designers attempt to balance their relative costs and benefits. One approach is to use a smaller amount of faster memory with a larger amount of slower memory. The faster memory is deployed at a higher level in the hierarchical memory system than the slower memory such that the faster memory is preferably accessed first. An example of a relatively faster memory is called a cache memory. An example of a relatively slower memory is a backing memory, which can include primary memory, main memory, backing storage, or the like.

A cache memory can accelerate data operations by storing and retrieving data of the backing memory using, for example, high-performance memory cells. The high-performance memory cells enable the cache memory to respond to memory requests more quickly than the backing memory. Thus, a cache memory can enable faster responses from a memory system based on desired data being present in the cache. One approach to increasing a likelihood that desired data is present in the cache is prefetching data before the data is requested. To do so, a prefetching system attempts to predict what data will be requested by a processor and then loads this predicted data into the cache. Although a prefetching system can make a cache memory more likely to accelerate memory access operations, data prefetching can introduce operational complexity that engineers and other computer designers strive to overcome.

BRIEF DESCRIPTION OF THE DRAWINGS

Apparatuses of and techniques for enabling a cache memory with randomized eviction are described with reference to the following drawings. The same numbers are used throughout the drawings to reference like features and components.

DETAILED DESCRIPTION

Overview

Figure 1:
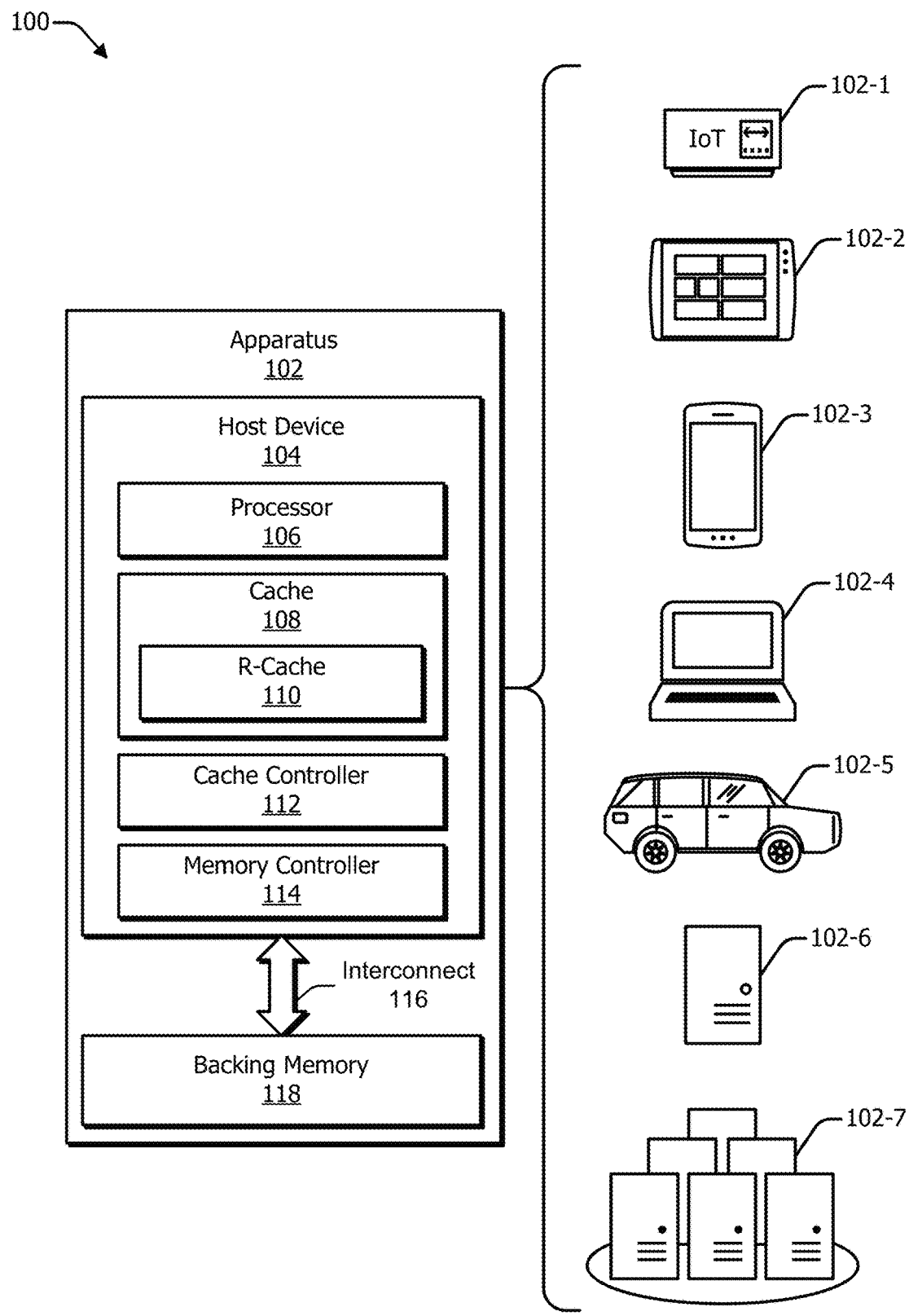
FIG. 1 illustrates an apparatus in which aspects of randomized eviction can be implemented for a memory system.

Advances in semiconductor process technology and microarchitecture have led to significant reductions in processor cycle times and increased processor density. Meanwhile, advances in memory technology have led to increasing memory density but relatively minor reductions in memory access times. Consequently, memory latencies measured in processor clock cycles are continually increasing. Cache memory, however, can help to bridge the processor-memory latency gap. Cache memory, which can store data of a backing memory, may be capable of servicing requests much more quickly than the backing memory. In some aspects, cache memory can be deployed "above" or "in front of" a backing memory in a memory hierarchy so that the cache memory is preferably accessed before accessing the slower backing memory.

Due to cost considerations, however, the cache memory may have a lower capacity than the backing or main memory. The cache memory may, therefore, load a selected subset of the address space of the backing memory. Data can be selectively admitted and/or evicted from the cache memory in accordance with suitable criteria, such as cache admission policies, eviction policies, replacement policies, and/or the like. During operations, data can be loaded into the cache in response to "cache misses." A cache miss refers to a request pertaining to an address that has not been loaded into the cache and/or is not included in the working set of the cache. Servicing a cache miss may involve fetching data from the slower backing memory, which can significantly degrade performance. By contrast, servicing requests that result in "cache hits" may involve accessing the relatively higher-performance cache memory without incurring latencies for accessing the relatively lower-performance backing memory. Because various cache policies determine which data are entered and/or retained in the cache memory for servicing requests, such cache policies often affect performance of the cache memory (e.g., a cache hit ratio, memory access time, memory access latency, etc.).

Generally, machines and electronics work in a deterministic fashion, which extends to preceding caching policies for entering and retaining data in a cache memory. For example, computer memories, such as cache memories, often feature a data eviction policy based on a First In, First Out (FIFO) ordering or a Least Recently Used (LRU) ordering. These FIFO, LRU, and other time-based cache policies are deterministic in that over time cache lines will be retired or evicted unless those cache lines are used more recently than other cache lines entered into or reused from the cache memory. In other words, depending on a size of a cache memory, the cache memory will evict a particular cache line in time irrespective of whether the cache line was important and included a piece of data that was heavily used by a processor or a requestor in the past.

By way of example, consider a 64 Kilobyte (64 KB) cache memory organized into 1024 cache lines of 64 bytes (64B) each. Assume that a processor requests 64B of important data (e.g., data used multiple times), which is not present in the cache memory and is entered in the cache memory to satisfy the initial request of the processor. Based on a FIFO or LRU cache policy, if there are 1024 new cache lines entries made after the last access of the important data, this important data will be evicted from the cache memory regardless of how many times it was previously accessed. In such a case, a probability of the cache line of important data remaining in the cache memory after 1024 subsequent entries is zero. Thus, the cache line of important data is completely forgotten by the cache memory even though it may have been used repetitively as important data before the new 1024 cache lines are entered into the cache. In other words, under these deterministic cache policies, the data will be discarded from the cache memory irrespective of its importance in the past, result in a cache miss, increased memory access latency, and generally a lower level of cache memory performance.

To address these and other issues associated with time-based or deterministic memories, this document describes aspects of cache memory with randomized eviction. In contrast with the preceding deterministic cache policies, a cache memory with a randomized or a probabilistic caching policy may operate in a non-deterministic fashion, which may improve cache performance. As opposed to a machine-based or deterministic process, the described aspects of operating a cache memory with a randomized or probabilistic cache policy may be considered similar to how a biological memory or organism works in a nondeterministic, objective and/or probabilistic fashion. By way of example, a human brain remembers events, impressions, or objects differently than how a typical machine or computer does so. Generally, the human brain will remember important incidents and events that happened in the distant past and may or may not remember unimportant events that happened recently. Extending similar principles to provide a cache policy capable of mimicking a human memory, an improved memory, assuming non-infinite size, should be able to store data related to recent events as well as important data of past events. As such, the aspects described herein may provide a nondeterministic cache memory based on the concepts of randomness and/or probability instead of a deterministic or definitive eviction criteria.

In various aspects of cache memory with randomized eviction, a cache policy may be based on randomized eviction of data from a cache memory. The described cache policies may replace the randomly evicted cache lines with new data or reused data from another cache line in the cache memory. Thus, multi-occupancy for data in the cache may be enabled such that data exists or resides in multiple cache lines of the cache memory. In some cases, the described aspects increase a probability of a cache hit for data that is used multiple times, which may correspond to a relative importance of that data versus other data that have been accessed more recently but fewer times or only once. Additionally, a time-based component of eviction may be omitted or removed from the described cache policies to avoid or preclude a deterministic eviction of the data from cache memory. By so doing, a cache memory implemented with aspects of randomized eviction can exhibit a form of long-term remembrance that may improve cache performance, particularly for important data that is used more than once.

In aspects of cache memory with randomized eviction, a cache policy with randomization may enable a memory cache circuit to evict any existing cache lines of a cache memory with a cache line of new data or a cache line or reused data (e.g., reused cache line). With multi-occupancy enable for cache lines, entering reused data in multiple cache lines results in the reused data being entered in multiple randomly evicted cache lines. Thus, in contrast with deterministic cache policies, one or more cache lines of the reused data may exist in a cache of N cache lines after N new cache line entries. In other words, for data that would be expected to be completely erased from cache memory under a preceding cache policy, the data still has a fair probability to exist in the cache memory under the nondeterministic cache policies described herein. Note, however, the probability of the data remaining in the cache memory under the nondeterministic cache policies may also decrease with each new cache entry.

Generally, a level of data importance may correspond to a number of times that a processor or program requests particular data over time. In other words, an important data or data of high importance can be defined as the data that has been reused multiple times. As an example of a cache policy with randomized eviction, consider the previous example in which a 64 KB cache memory included 1024 64k cache lines. With randomized eviction, a probability of any current cache line being selected for eviction when a new cache line is entered is $1/1024$. Conversely, the probability of an existing cache line not being evicted with each subsequent entry is $1-(1/1024)$ or $1023/1024$. Projecting this probability to 1024 entries, the probability of the existing cache line not being evicted after the 1024 subsequent cache entries is $(1023/1024)^{1024}$, which equals 0.37 or 37%. Thus, data expected to be completely erased from cache memory under a preceding caching policy (e.g., LIFO, LRU) may still have a fair probability (37%) to exist or remain in cache memory implemented in accordance with the aspects of randomized eviction described herein.

Further, various aspects that include multiple occupancy may further increase the probability that data remains in a cache memory based on reuse of the data. As noted, important data may include data that has been reused multiple times, and with multiple occupancy, the same data (e.g., reused data) can occupy multiple placements (e.g. cache lines) in the cache memory. In some cases, a reuse of data will copy existing data from a first cache location to a new, second cache location in addition to the existing occupancy at the first cache location. These copies of the data at multiple cache locations or cache lines will be "forgotten" slowly as cache lines are randomly evicted from the cache memory. In this case with same data at two cache locations, the probability of the data existing in the cache memory after 1024 new cache entries increases from 0.37 (37%) to 0.60 (60%). In other words, the described aspects may impart a level of importance on the data due to multiple usage, with the data having a 60% probability of still residing in the cache while preceding cache policies have a zero percent probability of retaining such data. By so doing, a cache memory implemented with randomized eviction and multiple occupancy may increase the probability that data used by a processor or requestor resides in the cache memory, thereby avoiding cache misses and increased memory access times associated with fetching the missed data from a slower backing memory.

Example Operating Environments

FIG. 1 illustrates at 100 an apparatus 102 in which aspects of cache memory with randomized eviction can be implemented. Generally, the apparatus 102 can be implemented as any suitable type of computing device or electronic device. The apparatus 102 can include, for example, an internet-of-things (IoT) device 102-1, tablet device 102-2, smartphone 102-3, notebook computer 102-4, an automobile 102-5, server computer 102-6, server cluster 102-7 that may be part of cloud computing infrastructure or a data center, or a portion thereof (e.g., a printed circuit board (PCB) or server blade). Other examples of the apparatus 102 include a wearable device (e.g., a smartwatch or intelligent glasses), entertainment device (e.g., a set-top box, video dongle, smart television, a gaming device), a graphics processor unit (GPU) card, desktop computer, mainboard, application-specific integrated circuit (ASIC), system-on-chip (SoC), server blade, consumer appliance, public transportation device, drone, industrial equipment, security device, sensor, or an electronic component thereof. These example apparatus configurations can include one or more components to provide various computing functionalities, data processing, and/or features.

In the example implementations shown at 100, the apparatus 102 may include a host device 104 with at least one processor 106 and a cache memory 108 (cache 108) that includes an instance of or is operably coupled to a cache memory with randomized eviction (r-cache 110). The host device 104 may also include a cache controller 112 (e.g., r-cache control logic), a memory controller 114, and an interconnect 116 that couples the host device to a backing memory 118. As described herein, the apparatus 102 and/or host device 104 can be implemented in various manners with more, fewer, or different components. For example, the host device 104 may include multiple cache memories (e.g., including multiple levels of cache memory and an r-cache memory) associated with the processor 106 and/or the memory controller 114. In other implementations, the host device 104 may omit the processor 106 or the memory controller 114. In addition to one or more cache memories, the host device 104 can include additional components to form a system-on-a-chip (SoC).

In aspects, the depicted components of the apparatus 102 represent an example computing architecture with a memory hierarchy or hierarchical memory system. For example, the cache 108 and r-cache 110 can be logically coupled between the processor 106 and the memory controller 114. Further, the memory controller 114 can be logically coupled between the processor 106 (and/or cache 108) and the backing memory 118 through the interconnect 116. Thus, in FIG. 1, the cache 108 and r-cache 110 are at a higher level of the memory hierarchy than memory coupled to the memory controller 114, cache memory of the memory controller 114, the backing memory 118, or other cache memories (not shown) coupled to the host device 104. Generally, a memory element higher in the hierarchy may provide an increased level of performance relative memory elements lower in the hierarchy. Thus, the cache 108 and/or r-cache 110 coupled to the processor may service requests for data or instructions with less latency or in fewer clock cycles than the backing memory 118. Although not shown except for the interconnect 116, respective interconnects or circuitry that couple various components can enable data to be transferred between or among the various components. Interconnect examples include a bus, a switching fabric, one or more wires that carry voltage or current signals, or the like.

The processor 106 may be implemented as any suitable type of processor, which may include a general-purpose processor, one or more processing cores, a central processing unit (CPU), a graphics processing unit (GPU), a neural network engine or accelerator, an application-specific integrated circuit (ASIC), a field-programmable gate array (FPGA) integrated circuit (IC), a communications processor (e.g., a modem or baseband processor), or the like. The processor 106 may represent one or more processor cores configured as homogeneous processor cores or heterogenous processor cores. To operate, the processor 106 may execute instructions and/or manipulate data in accordance with instructions or codes of a routine, program, application, or the like that execute on the host device 104. When instructions or data for executing a program or application are not available in local storage of the processor 106 (e.g., instruction or data buffers), the processor 106 may issue a request (e.g., as a requestor) to the cache 108 (and/or r-cache 110) for the data or instructions useful to advance execution of the processor. In the context of this disclosure, a request for data may include a request for data, a request for instructions, or a request for data and instructions from memories operably coupled to the processor 106.

Although a particular implementation of the processor 106, cache 108, and r-cache 110 is depicted in FIG. 1 with the caches being separate from the processor 106, the components of an apparatus 102 or a host device 104 can be implemented in alternative manners. For example, the processor 106 may include additional caches, including multiple levels of cache memory (e.g., multiple cache layers). In some implementations, the processor 106 may include one or more internal memory and/or cache layers, such as instruction registers, data registers, an L1 cache, an L2 cache, an L3 cache, and/or the like. In some aspects, the cache 108 and/or r-cache 110 may represent one or more of an L1 cache, an L2 cache, or an L3 cache (e.g., shared cache) associated with the processor 106, a processor core, an instance of a processing thread, or the like. Further, the memory controller 114 and the backing memory 118 may be coupled "below" the illustrated cache 108 and/or r-cache 110. Generally, the cache 108 may operate in accordance with a deterministic or time-based cache policy (e.g., FIFO or LRU policy) and the r-cache can operate in accordance with a non-deterministic, randomized, or probabilistic cache policy in accordance with aspects described herein.

The cache 108 and the r-cache 110 may be realized in various manners. In some implementations, the cache 108 and the r-cache 110 are both disposed on, or physically part of, a processor with the backing memory 118 comprising "main memory" of a mainboard or motherboard on which the processor is disposed. The backing memory 118 may include DRAM and the host device 104 may be coupled to another non-transitory memory device or module that provides persistent memory. Nonetheless, the components may be implemented in alternative ways, including in distributed or shared memory systems, some of which are described with reference to FIGS. 2-4. Further, a given apparatus 100 may include more, fewer, or different components.

The cache 108 and/or r-cache 110 can be configured to improve memory performance by storing data of the relatively lower-performance backing memory 118 within at least one of the relatively higher-performance cache memories. The cache 108 and r-cache 110 can be provided or be embodied by cache hardware, which can include, but is not limited to: semiconductor integrated circuitry, memory cells, memory arrays, memory banks, memory chips, and/or the like. In some aspects, the cache 108 and r-cache 110 include respective memory arrays. A memory array may be configured as a cache memory 108 or an r-cache 110 that includes a plurality of cache units or placements, such as cache lines or the like. The memory array may be a collection (e.g., a grid) of memory cells, with each memory cell being configured to store at least one bit of digital data.

The cache 108 and/or r-cache 110 (and/or memory array thereof) may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion implantation, or by any other doping mechanism. The disclosure is not limited in this regard, however; the cache 108 and/or r-cache 110 may include any suitable memory and/or memory mechanism including, but not limited to: a memory, a memory array, semiconductor memory, cache circuit, volatile memory, RAM, SRAM, DRAM, SDRAM, non-volatile memory, solid-state memory, Flash memory, and/or the like.

In aspects, the cache 108 and/or r-cache 110 may receive requests from a requestor (e.g., host device 104 or processor 106) pertaining to data of the backing memory 118. A requestor can include any suitable entity requested data or instructions from the cache memories, which may include a processor, a processor core, a host, a client, an execution thread, program, application, and so forth. Generally, data can be loaded into cache lines of the cache 108 or r-cache 110 on a cache-line basis. When the requested data is present in the cache 108 or r-cache 110, the cache services the request by returning the data from a requested cache line to the requestor. When a cache miss occurs, data can be transferred from the backing memory 118 into a cache line of the cache 108 or r-cache 110. As described herein, aspects of cache memory with randomized eviction may enable an r-cache 110 may implement randomized cache line eviction and multi-occupancy with reused data of cache hits. These and other aspects of cache memory with randomized eviction are described throughout the disclosure.

In aspects, the cache controller 112 can configure the cache 108 and the r-cache 110. For example, the cache controller 112 can partition a cache memory into a cache 108 and an r-cache 110 and apply respective deterministic and non-deterministic cache policies to the cache 108 and an r-cache 110 partitions. Alternatively, the cache controller 112 may select a cache associated with a processor and apply a non-deterministic cache policy to the cache to provide an r-cache 110 for the processor. In aspects, a non-deterministic cache or caching policy of the r-cache 110 includes a randomized eviction policy in which any cache line may be randomly selected for eviction from the cache to facilitate entry of new data or reused data. The non-deterministic or randomized eviction policy may also include multi-occupancy to enable same data to occupy multiple cache lines of the r-cache 110. The cache controller 112 can configure the r-cache 110 to support different types of cache access, which may include direct-mapped caching, fully associative caching, or N-way-set-associative caching. In some cases, the randomized eviction policy is configured based on the type-configuration of the r-cache such that cache lines for eviction are randomly selected from candidate cache lines to which new or reused data can be stored (e.g., any N lines of cache).

In operation, the memory controller 114 can provide a high-level or logical interface between the processor 106 and at least one backing memory 118 (e.g., a memory array or external memory) that is coupled to the host device 104 using a respective interconnect. The memory controller 114 can, for example, receive memory requests from the processor 106, the cache 108, the r-cache 112, or another component of the host device 104 (e.g., cache circuit/controller) and provide the memory requests to a memory array with appropriate formatting, timing, and reordering in accordance with a memory access protocol or specification (e.g., protocols of a Double Data Rate 5 (DDR5), Low-Power DDR5 (LPDDR5), Double Data Rate 6 (DDR6), or Low-Power DDR 6 (LPDDR6)) specification. The memory controller 114 can also forward or return memory responses received from the memory array to the processor 106, the cache 108, the r-cache 112, or the other component of the host device 104.

The backing memory 118 may represent main memory, system memory, backing memory, backing storage, a combination thereof, and/or the like. The backing memory 118 may be realized with any suitable memory and/or storage facility including, but not limited to: a memory array, semiconductor memory, read-only memory (ROM), random-access memory (RAM), Static RAM (SRAM), Dynamic RAM (DRAM), Synchronous DRAM (SDRAM), thyristor random access memory (TRAM), ferroelectric RANI (FeRAM), magnetic RAM (MRAM), resistive RANI (RRAM), magneto-resistive RAM (MRAM), spin-torque transfer RAM (STT RAM), phase-change memory (PCM), three-dimensional (3D) stacked DRAM, Double Data Rate (DDR) memory, high bandwidth memory (HBM), a hybrid memory cube (HMC), solid-state memory, Flash memory, NAND Flash memory, NOR Flash memory, 3D XPoint™ memory, and/or the like. In some aspects, the host device 104 can further include and/or be coupled to non-transitory storage, which may be realized with a device or module including any suitable non-transitory, persistent, solid-state, and/or non-volatile memory.

The host device 104 can be operatively coupled, using the interconnect 116 of the apparatus 102, to another cache memory (e.g., another r-cache, not shown), which may be operatively coupled to the backing memory 118. As shown in this example, the backing memory 118 is connected to the host device 104 using the interconnect 116 without an intervening buffer or cache. The backing memory 118 may also operatively couple to a storage memory (not shown) of the apparatus 102. The storage memory can include, for example, a storage-class memory device (e.g., a flash memory, hard disk drive, solid-state drive, phase-change memory (PCM), or memory employing 3D XPoint™). The host device 104 can be coupled, directly or indirectly, using the interconnect 116, to the backing memory 118, other memory devices, and a storage memory. This interconnect 116 can transfer data between two or more components of the apparatus 102. Examples of the interconnects include a bus, switching fabric, and one or more signal lines that carry voltage or current signals. Though not illustrated, the interconnect 116 can include at least one command/address (CA) bus and at least one data (DQ) bus. Each bus may be a unidirectional or a bidirectional bus. In some implementations, an interconnect 116 may also include a chip-select (CS) I/O that can, for example, couple to one or more CS pins of a memory device of the backing memory 118. An interconnect 116 may also include a CK bus that is part of or separate from the CA bus.

Figure 2:
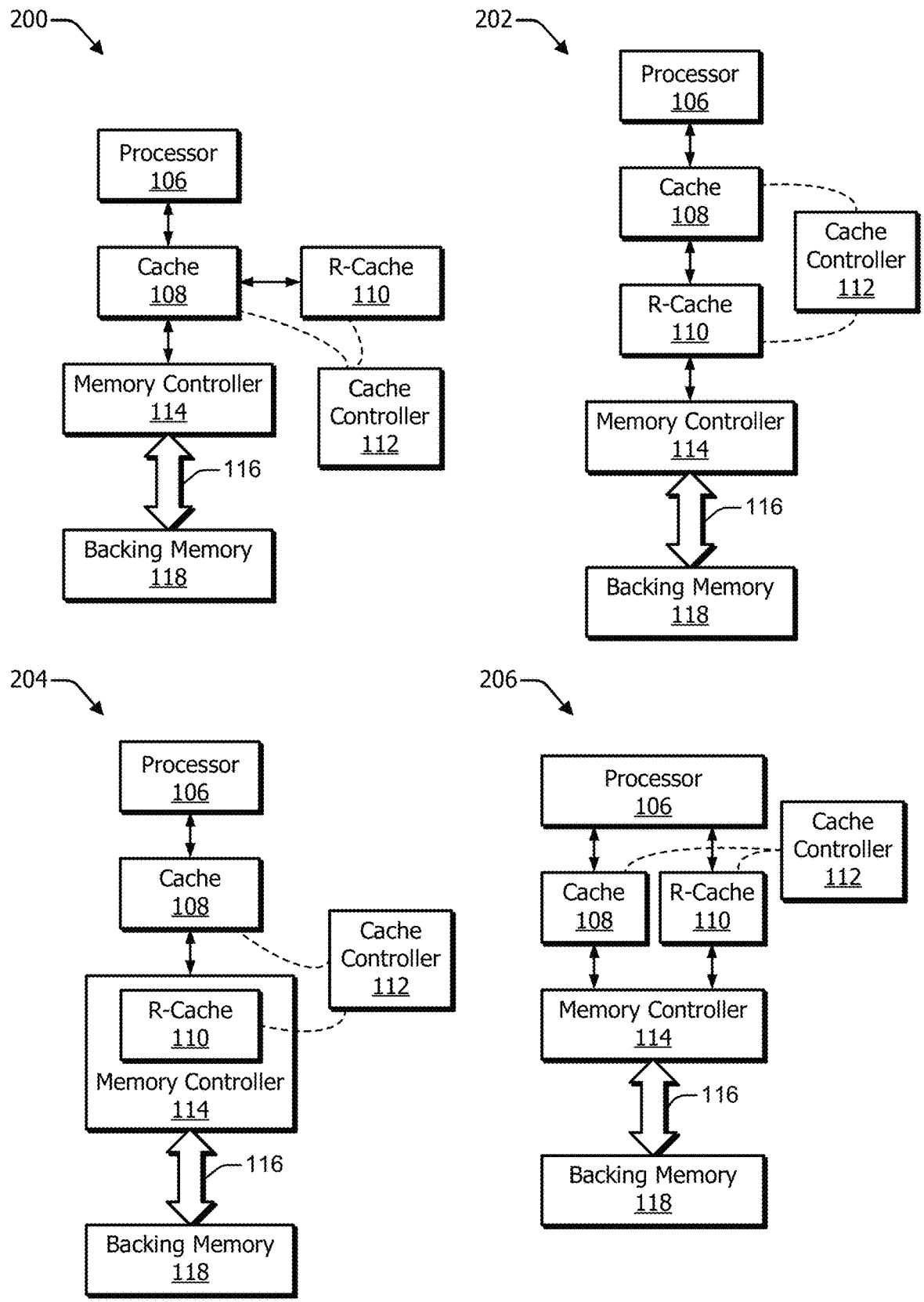
FIG. 2 illustrates example configurations of a cache memory with randomized eviction that can be implemented in association with components of a host device in accordance with one or more aspects.

FIG. 2 illustrates example configurations of a cache memory with randomized eviction (r-cache) that can be implemented in association with components of a host device in accordance with one or more aspects. The example configurations may be implemented as hosts or integrated processor systems to which the backing memory 118 is coupled via the interconnect 116. In the illustrated configurations of FIGS. 2-4 and apparatus of FIG. 1, an r-cache 110 can be coupled to a requestor (e.g., processor 106) by and/or through an interconnect or an intermediate component. Alternatively or additionally, the r-cache 110 may be embodied on or implemented as part of another component, which may include the processor 106, the cache 108, or the memory controller 114.

As used herein, "coupled to" generally refers to a connection between components, which can be an indirect communicative connection (e.g., with intervening components) or direct communicative connection (e.g., without intervening components), whether wired or wireless, including connections such as electrical, optical, magnetic, etc. Examples of an interconnect, such as the interconnects between the processor and caches and/or backing memory, but are not limited to, a bus, signal lines, signal traces, a CPU/memory interconnect, a memory bus, a storage bus, a peripheral bus, a memory interconnect, a storage interconnect, a peripheral interconnect, a backplane, a system bus, a front-side bus, a back-side bus, an Advanced Graphics Port (AGP) bus, a peripheral bus, a peripheral component interconnect (PCI) interconnect, a PCI express (PCIe) bus, a serial advanced technology attachment (SATA) interconnect, a universal serial bus (USB), Fibre Channel, Serial Attached SCSI (SAS), a network, a network-on-chip (NoC) interconnect, a mesh network, or the like.

The interconnects, which may be illustrated as connective lines or arrows between components, can provide for passing control, address, data, and/or other signals between a requestor and other components (e.g., cache 108, r-cache 110, cache controller 112, memory controller 114, backing memory 118, and/or the like). As illustrated in FIG. 1, the r-cache 110 can be coupled to the processor 106 through the cache 108 and to the backing memory 118 by and/or through the interconnect 116. Alternatively or additionally, the r-cache 110 can be coupled to the processor or a requestor and/or backing memory 118 through other interconnects, interfaces, buses, and/or the like. In some aspects, an instance of r-cache 110 can be interposed between the host device 104 and the backing memory 118 or a persistent storage device.

As shown at 200 of FIG. 2, an r-cache 110 can be coupled to cache 108, which may include multiple levels or layers of cache for the processor 106. For example, the cache 108 may include an L1 cache, an L2 cache, and an L3 cache of the processor 106. In some cases, the L1 cache includes respective sections configured to cache data and instructions for the processor. The r-cache 110 may be coupled to one or more of levels or layers of cache of the cache 108. Additionally, the cache controller 112 may be operably coupled with one or both of the cache 108 and r-cache 110. In aspects, the cache controller 112 may partition a portion of the cache 108 to form an r-cache 110 with a nondeterministic cache policy and/or enable multi-occupancy.

As another example, consider the configuration shown at 202 in which an r-cache is coupled between the cache 108 and the memory controller 114 and/or backing memory 118. As noted, the cache 108 may include or be sectioned into multiple levels or layers of cache for the processor 106. In some cases, the cache 108 includes L1 cache and/or L2 cache, with the r-cache 110 representing an L3 cache or shared cache for the processor. In such cases, the r-cache 110 may service requests for data after a cache miss in cache 108 and before the request for data propagates to the backing memory 118. Additionally, the cache controller 112 may be operably coupled with one or both of the cache 108 and r-cache 110, enabling the cache controller 112 to configure the cache memories as described herein.

In a configuration illustrated at 204, an r-cache 110 is implemented as part of a memory controller 114 in accordance with one or more aspects. In this configuration, the r-cache 110 of the memory controller 114 may service requests for data issued to the backing memory 118. In other words, the r-cache 110 may operate in a transparent fashion to a host device and improve memory performance by servicing a data request, when present in the r-cache 110, without fetching the requested data from the backing memory 118. Additionally, the cache controller 112 may be operably coupled with one or both of the cache 108 and r-cache 110, enabling the cache controller 112 to configure the cache memories as described herein.

At 206, another configuration is illustrated in which a cache 108 and r-cache 110 are implemented between a processor 106 and a memory controller 114. Although shown as separate caches, the deterministic cache 108 and nondeterministic r-cache 110 may be sectioned or partitioned from a same logical set of cache memory. In some cases, the partitioning or proportions of the cache 108 and the r-cache 110 are set or adjusted based on a workload of the processor 106. For example, to support a sequential workload, the cache controller 112 may set a size of the cache 108 larger than a size of the r-cache 108. In other cases, to support a variable or non-sequential workload, the cache controller 112 may set a size of the r-cache 110 larger than a size of the cache 110. By so doing, the long-term remembrance and/or nondeterministic nature of the r-cache 108 may improve processor performance by reducing a number of cache misses, such as for non-sequential data requests. Additionally, the cache controller 112 may be operably coupled with one or both of the cache 108 and r-cache 110, enabling the cache controller 112 to configure the cache 108 or r-cache 110 as described herein.

Figure 3:
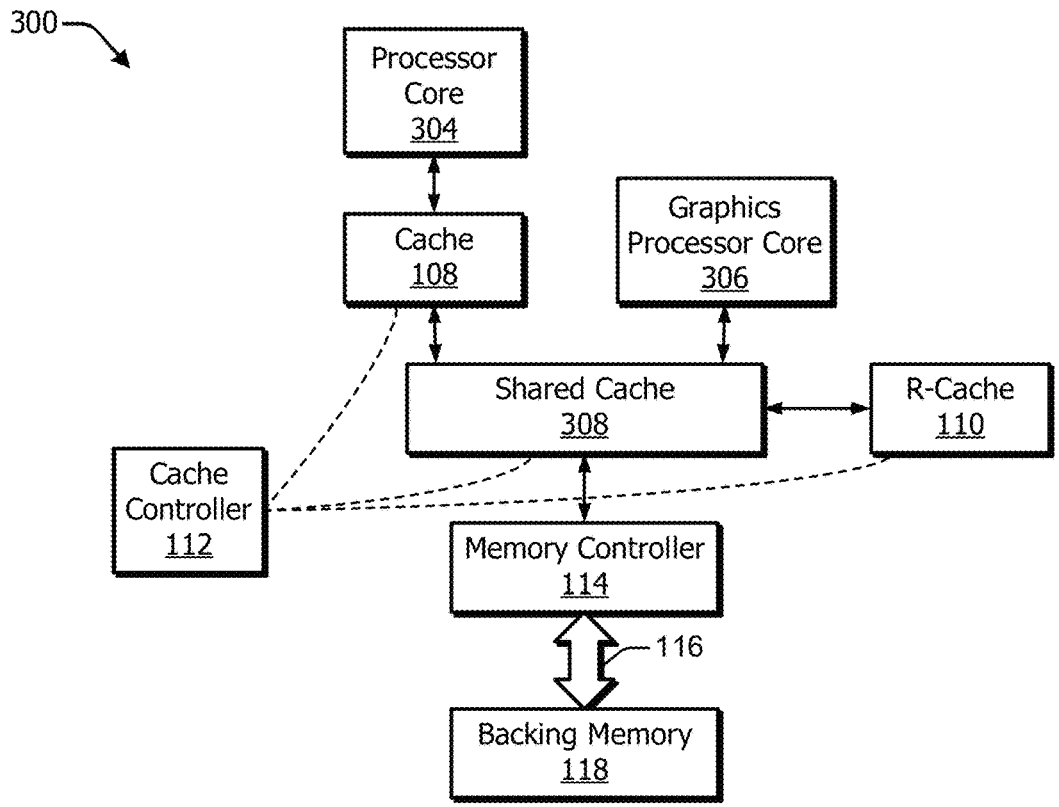
FIG. 3 illustrates other example configurations of a cache memory with randomized eviction that can be implemented in a host device that includes a graphics processor core in accordance with one or more aspects.
Figure 3:
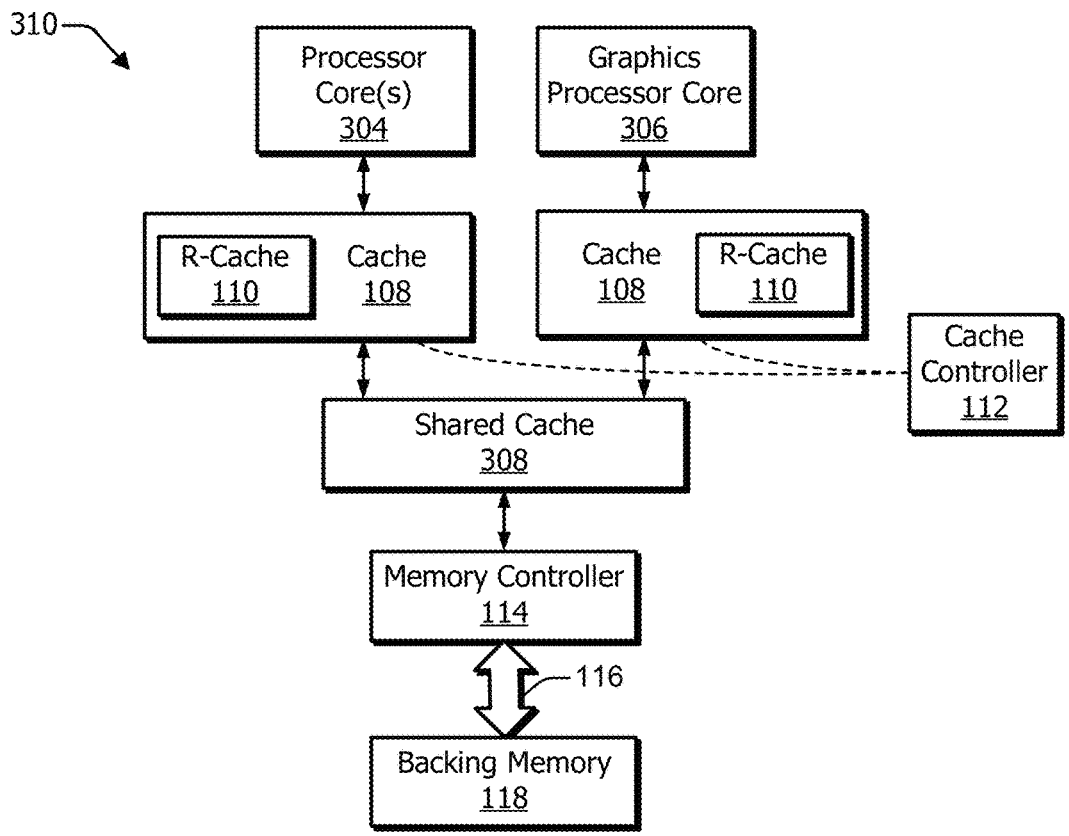

FIG. 3 illustrates at 300 and 302 other example configurations of a cache memory with randomized eviction (r-cache) that can be implemented in a host device that includes a graphics processor core in accordance with one or more aspects. In the example configurations, a system or host device may include one or more processor cores 304, a graphics processor core 306 (e.g., a core of a graphics processing unit (GPU)), and/or a shared cache memory 308, which may be shared by two or more of the processor cores 304 and/or the graphics processor core 306. Alternatively or additionally, a cache 108 (e.g., a deterministic cache) coupled to a processor core 304 or graphics processor core 306 may include multiple levels or layers of cache for a respective process core. For example, a cache 108 may include an L1 cache and an L2 cache, with the shared cache 308 serving as an L3 cache for two or more processor cores.

As shown at 300 of FIG. 3, an r-cache 110 can be coupled to a shared cache 308, which may service requests for data from the processor core 304, the graphics processor core 306, or any other suitable requestor. In aspects, the cache controller 112 may partition or section a cache memory to provide the shared cache 308 and the r-cache 110 to service requests from the processor cores of a CPU and/or processor cores of a GPU. Generally, the r-cache 110 can transact with the shared cache 308, with these caches being shared between the processor cores. In various aspects, the cache controller 112 can determine a ratio or respective proportions of the shared cache 308 and the r-cache 110 based on a memory workload and may configure the shared cache 308 and the r-cache 110 to optimize cache utilization. By combining aspects of a deterministic cache and a nondeterministic cache, the illustrated configuration or architecture may retain the deterministic characteristics associated with preceding cache types, as well as provide some level of human brain-like behavior of remembering important data or events for a long time (e.g., longer than an eviction time of a deterministic cache memory).

As another example, consider the configuration shown at 310 in which respective instances of an r-cache are implemented in or embodied on separate caches 108 of processor cores 304 and a graphics processor core 306. Generally, a cache 308 may include or be sectioned into multiple levels or layers of cache for the processor cores 304 or graphics processor core 306. For example, either of the caches 108 may include an L1 cache, an L2 cache, and an L3 cache of one of the respective processor cores. In this configuration, the r-cache 110 may transact with the cache 108 or one or more of the cache levels of a cache 108. In some cases, the cache controller 112 may partition or section a portion of L2 cache and/or L3 cache to prove the illustrated r-cache 110. In such cases, the r-cache may transact with the L2 cache and/or L3 cache from which the r-cache 110 is provided. Alternatively, although illustrated with a deterministic cache coupled to the processor cores 304 and the graphics processor core 306, this configuration or any of the configurations of FIGS. 2-4 may feature an r-cache 110 in place of the cache 108. For example, an L2 or L3 cache may be implemented or configured as an r-cache 110 with a randomized eviction cache policy and/or multi-occupancy enabled.

Figure 4:
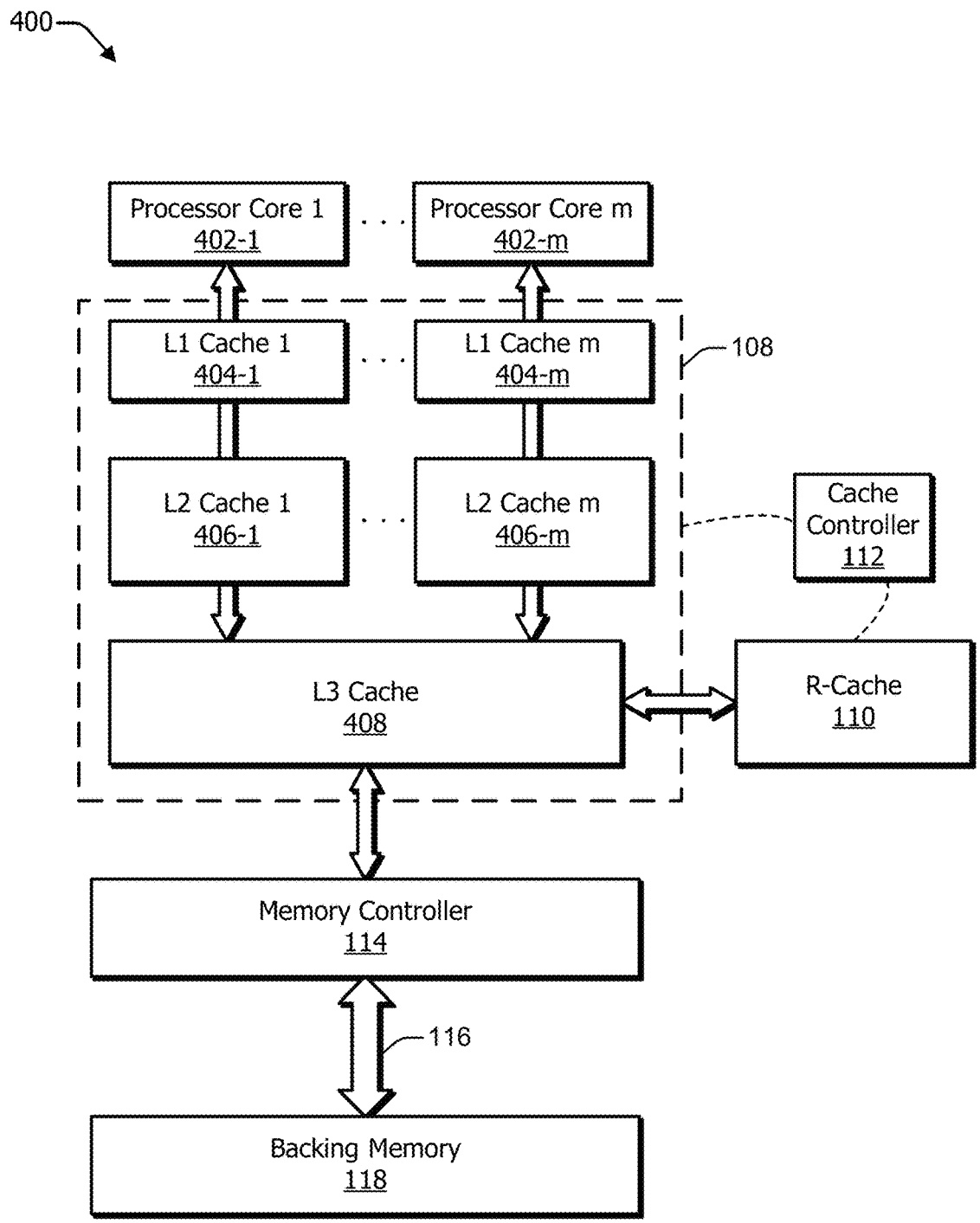
FIG. 4 illustrates an example configuration of a cache memory implemented in association with a shared cache in accordance with one or more aspects.

FIG. 4 illustrates at 400 an example configuration of a cache memory with randomized eviction (r-cache) implemented in association with a shared cache in accordance with one or more aspects. In this example configuration, a host or system may be implemented with multiple processor cores with similar configurations (e.g., multiple homogeneous processor cores) or different configurations (e.g., a mix of CPU and/or GPU processor cores). In the context of FIG. 4, a host device or system can be implemented with any number of processor cores 402-1 through 402-$m$, where m is any suitable integer. Additionally, an internal configuration of the cache 108 is shown with multiple levels or layers of L1 cache 404, L2 cache 406, and L3 cache 408 (e.g., shared cache) for respective ones of the processor cores 402-1 through 402-$m$. Here, each of the processor cores 402-1 through 402-$m$ may be coupled to respective one of L1 cache 404-1 through 404-$m$ and a respective one of L2 cache 406-1 through 406-$m$. Alternatively, the cache 108 may be configured or reconfigured, such as by the cache controller 112, with any number of L1 caches and/or L2 caches. Generally, the L1 cache 404, L2 cache 406, and L3 cache 408 of the cache 108 can be organized as a hierarchical memory system for servicing requests from the processor cores, with cache misses resulting in requests that propagate to a relatively lower level of cache or memory (e.g., backing memory 118) for servicing.

In aspects, an r-cache 110 can be coupled to the L3 cache 408, which may service requests for data from the processor cores 402-1 through 402-$m$, relatively higher levels of the cache 108, or any other suitable requestor. In aspects, the cache controller 112 may partition or section an L3 cache memory to provide the L3 cache 408 and the r-cache 110 to service requests from the processor cores 402-1 through 402-$m$. Generally, the r-cache 110 can transact with the L3 cache 408, with these caches being shared between the processor cores. In various aspects, the cache controller 112 can determine a ratio or respective proportions of the L3 cache 408 and the r-cache 110 based on a memory workload (e.g., sequential vs non-sequential) and may configure the L3 cache 408 and the r-cache 110 to optimize cache utilization (or minimize cache misses). In some cases, the L3 cache 408 and the r-cache 110 complete or respond to requests for data with a similar or same amount of latency, which improves memory performance relative to fetching requested data from the backing memory 118.

In some aspects, providing both the L3 cache 408 and an r-cache 110 may enable a host or system to support execution of many types of programs or applications, some of which are built around legacy or deterministic cache policies. By so doing, the host or system that includes an r-cache 110 may operate in a transparent fashion from the perspective of a requestor. For example, for cache misses at an L2 level, either of the L3 cache 408 or the r-cache 110 may provide data in response to a request for data that is issued from a processor core 402 or L2 cache 406. As noted, by combining aspects of a deterministic cache and a nondeterministic cache, the aspects described herein may retain the deterministic characteristics associated with preceding cache types, as well as provide some level of human brain-like behavior of remembering important data or events for a long time. Because the r-cache 110 has a higher probability of retaining important data, the r-cache 110 may improve memory performance of a host or system by completing a request for data that is no longer in the cache 108, which deterministically evicts data based on time.

Figure 5:
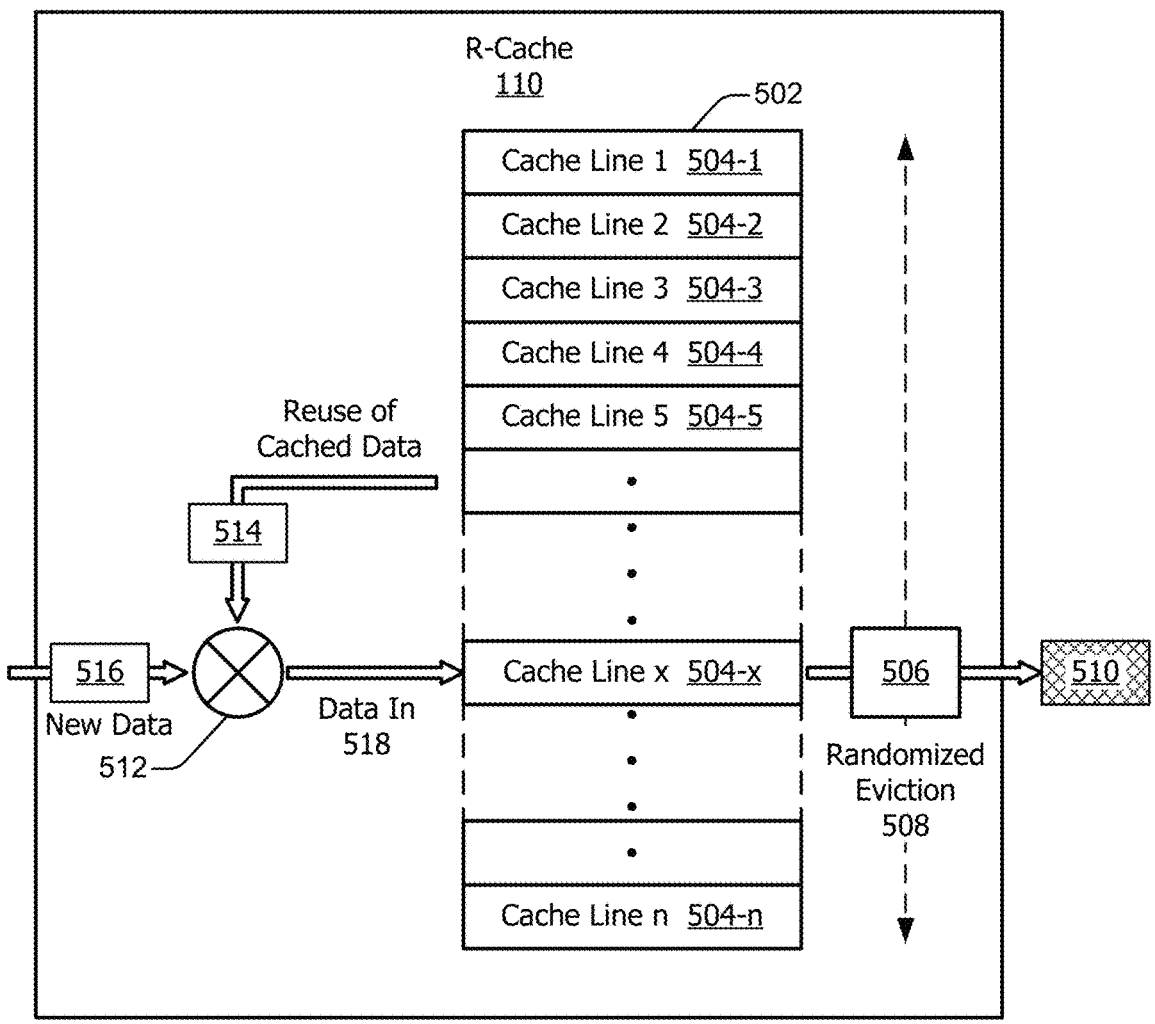
FIG. 5 illustrates an example of a cache memory implemented with randomized eviction in accordance with one or more aspects.

FIG. 5 illustrates at 500 an example of a cache memory implemented with randomized eviction (e.g. randomized cache or r-cache) in accordance with one or more aspects. An r-cache 110 illustrated at 500 may be implemented as or represent any instance of an r-cache described with reference to FIGS. 1-4 and/or FIGS. 6-13. Generally, the r-cache 110 may service requests for data or instructions received from a requestor, which may include a processor core, a host, a program, an application, another memory (e.g., responsive to a cache miss), or the like. Although not shown, the r-cache 110 may be coupled to and transact with a processor, another cache, a memory controller, a memory management unit (MMU), a cache controller, and/or an interconnect. Accordingly, the r-cache 110 may access or obtain data (e.g., new data) from another cache or memory (e.g., backing memory or main memory) to implement various aspects or operations described herein.

In aspects, an r-cache 110 may include or be implemented with any suitable combination of hardware, firmware, or software to provide the various functionalities herein. In some cases, an r-cache is implemented by using a cache policy with randomization (nondeterministic) eviction or replacement to enable a memory cache to evict data from any cache line of the cache memory. The cache policy may also replace the evicted data with a cache line of new data or a cache line or reused data from another cache line of the cache memory. In aspects, such a randomized cache policy may be applied to an entire cache or to a portion (or section)

of a cache, with another portion operating based on a deterministic cache policy. Alternatively or additionally, an r-cache may be implemented through hardware-based, hard-coded, or configurable logic or circuitry to operate with randomized eviction and multi-occupancy to implement aspects described herein.

As shown in FIG. 5, this example r-cache 110 includes a cache memory 502 (e.g., a cache array, cache area, cache circuit, etc.) that can be configured with any number of cache lines 504-1 through 504-n, where n is any suitable integer. In some aspects, the cache memory 502 may include a portion or partition of cache memory of a larger cache memory, which may be partitioned or sectioned into multiple portions of cache memory. A cache line 504 may include data corresponding to and/or obtained from another cache (e.g., L1 cache, L2 cache) or another memory, which may include the backing memory 118. As such, the cache lines 504-1 through 504-n of the r-cache may include respective data obtained or read from memory when a cache entry is created or entered into the r-cache. Although not shown, each cache line 504 may include or be associated with address information for data of the cache line, which may include a tag, set index, block offset, and so forth.

In some aspects, the r-cache 110 includes a randomized evictor 506 to provide randomized eviction, as shown at 508, to evict data 510 (e.g., discarded data) from any one of the cache lines 504 of the r-cache 110. The randomized evictor 506 may randomly select any of the cache lines 504, such as cache line 504-x in this example, for eviction and/or replacement by data provided by a data entry function 512 of the r-cache. Here, note that "x" of the evicted cache line may be any integer selected through any suitable randomized, nondeterministic, and/or probabilistic process or function. For example, the r-cache 110 may include or be coupled with a random number generator, pseudorandom number generator, cipher stream, entropy source, or the like, from which a randomized selection of cache lines can be provided.

To replace the evicted cache line, the data entry function 512, which supports multi-occupancy, can obtain or copy reused data 514 from another cache line (e.g., for an r-cache hit) or obtain new data 516, such as from another memory or cache in response to an r-cache miss. The data entry function 512 then inputs the reused data 514 or new data 516 into the evicted cache line as shown at 518. As described herein, with multi-occupancy, the reused data 514 now occupies at least two cache lines 504 in the r-cache 110, thereby increasing a probability that this data will exist in the r-cache when requested again. In aspects, the data entry function 512 may also copy tag bits and other information associated from the cache line of the reused data 514 and associate the tag and other information with the cache line (e.g., cache line 504-x) to which the reused data 514 is copied. The various functionalities described with reference to the randomized evictor 506, data entry function 512, and/or r-cache 110 can be provided any suitable combination of hardware, firmware, or software.

Figure 6:
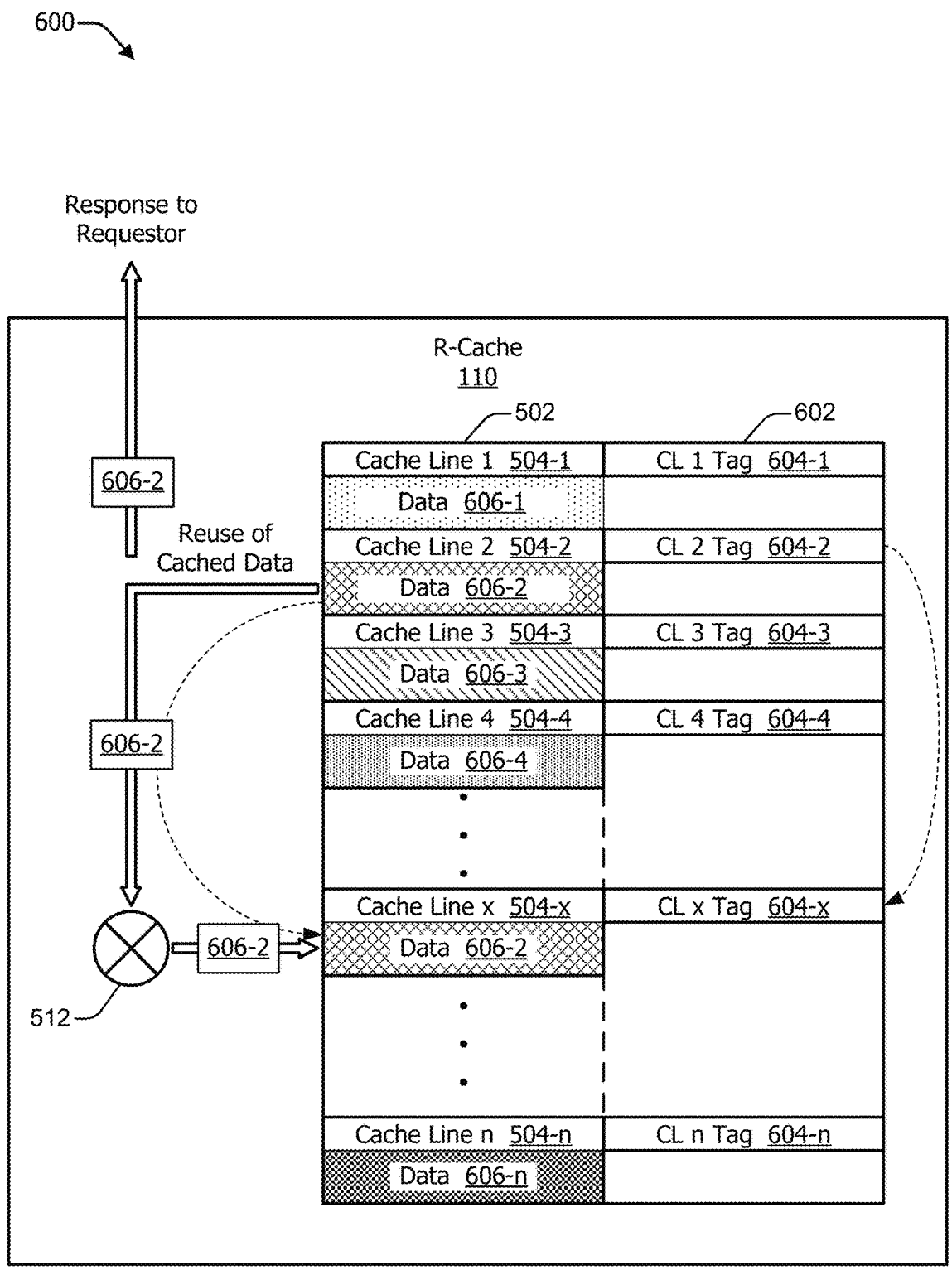
FIG. 6 illustrates an example of cache data reuse in accordance with one or more aspects.

By way of example, consider FIG. 6 which illustrates at 600 an example of cache data reuse in accordance with one or more aspects. In this example, the r-cache is shown with an array of tag information (tag array 602) for the cache lines 504 of the r-cache 110. Here, the tag array includes respective tags 604-1 through 604-n for corresponding ones of the cache lines 504-1 through 504-n of the r-cache 110. Although not shown, the r-cache 110 may include an additional or alternate information array configured to store a respective set index, block offset, and/or other information for each of the cache lines 504. Generally, a tag 604 may include one or bits to indicate a status of a corresponding cache line 504 of the r-cache. Here, the cache lines 504-1 through 504-n are also illustrated as storing respective data 606-1 through 606-n, with each data 606 being capable of occupying multiple cache lines 504 of the r-cache 110. In the context of FIG. 6, assume a processor core 304 or another requestor issues a request for data 606-2 of cache line 504-2 of the r-cache 110.

To satisfy this request, the r-cache 110 may provide a copy of the data 606-2 to the requestor (not shown) and initiate a randomized caching of the reused data of the r-cache. Here, assume that cache line x 504-x is selected for randomized eviction and replacement. The data entry function 512 then copies data 606-2 from cache line 504-2 to cache line x 504-x, thereby providing at least two copies of data 606-2 in the r-cache. In some aspects, the data entry function 512, or a controller of the tag array 602, updates the cache line x tag 604-x with information matching the cache line 2 tag 604-2. By so doing, the r-cache 110 may also create and/or maintain multiple same or similar cache line tags for the corresponding multiple instances of data that exist or reside in the r-cache. Alternatively or additionally, the data entry function 512 or other r-cache circuitry may update an associated set index, block offset, or other information of cache line x 504-x to correspond with information of cache line 2 504-2 from which the reused data 606-2 is obtained.

In aspects of cache memory with randomized eviction, the randomized eviction and multi-occupancy implemented by the r-cache 110 may enable one or more cache lines of the reused data to exist in multiple cache lines 504 of the r-cache 110. Additionally, without a time-based constraint on cache line eviction, data in cache lines 504 of the r-cache may exist after a number of new cache line entries that meet or exceed a number of cache lines 504 of an r-cache 110. In other words, for data that would be expected to be completely erased from cache memory under a preceding cache policy, the data still has a fair probability to exist in the r-cache 110.

By way of example, consider the r-cache 110 of FIGS. 5 and 6 in which the "n" of a number of cache lines 504-1 through 504-n is equal to 1024. With randomized eviction, a probability of any current cache line being selected for eviction when a new cache line is entered is $1/1024$. Conversely, the probability of an existing cache line not being evicted with each subsequent entry is $1-(1/1024)$ or $1023/1024$. Projecting this probability to 1024 entries, the probability of the existing cache line not being evicted after the 1024 subsequent cache entries is $(1023/1024)^{1024}$, which equals 0.37 or 37%. Thus, data expected to be completely erased from cache memory under a preceding caching policy (e.g., LIFO, LRU) may still have a fair probability (37%) to exist or remain in cache memory implemented in accordance with the aspects of randomized eviction described herein. Note, however, the probability of the data remaining in the cache memory under the nondeterministic cache policies may also decrease with each new cache entry. This probability may be generalized as shown in Equation 1 in which a probability "$P_{CL}$" of a cache line (CL) remaining in the cache of size "s" entries after an $n^{th}$ new entry is inserted into the cache.

$$P_{CL} = \left[\frac{s-1}{s}\right]^n \quad \text{Equation 1}$$

Probability of Cache Line Remaining

In aspects of cache memory with randomized eviction, an r-cache as described herein has a higher probability of maintaining data reused multiple times. In other words, the r-cache may mimic or emulate a biological long-term memory by remembering important events or data with which multiple interactions occur. In the context of this disclosure, important data may be considered as data that is reused multiple times. In accordance with one or more aspects, the more a same data is requested from an r-cache, a probability of that data remaining in the r-cache increases, which may increase cache hits and reduce cache misses for such data that may typically be evicted from a deterministic cache (e.g., FIFO, LRU caching policies).

Figure 7:
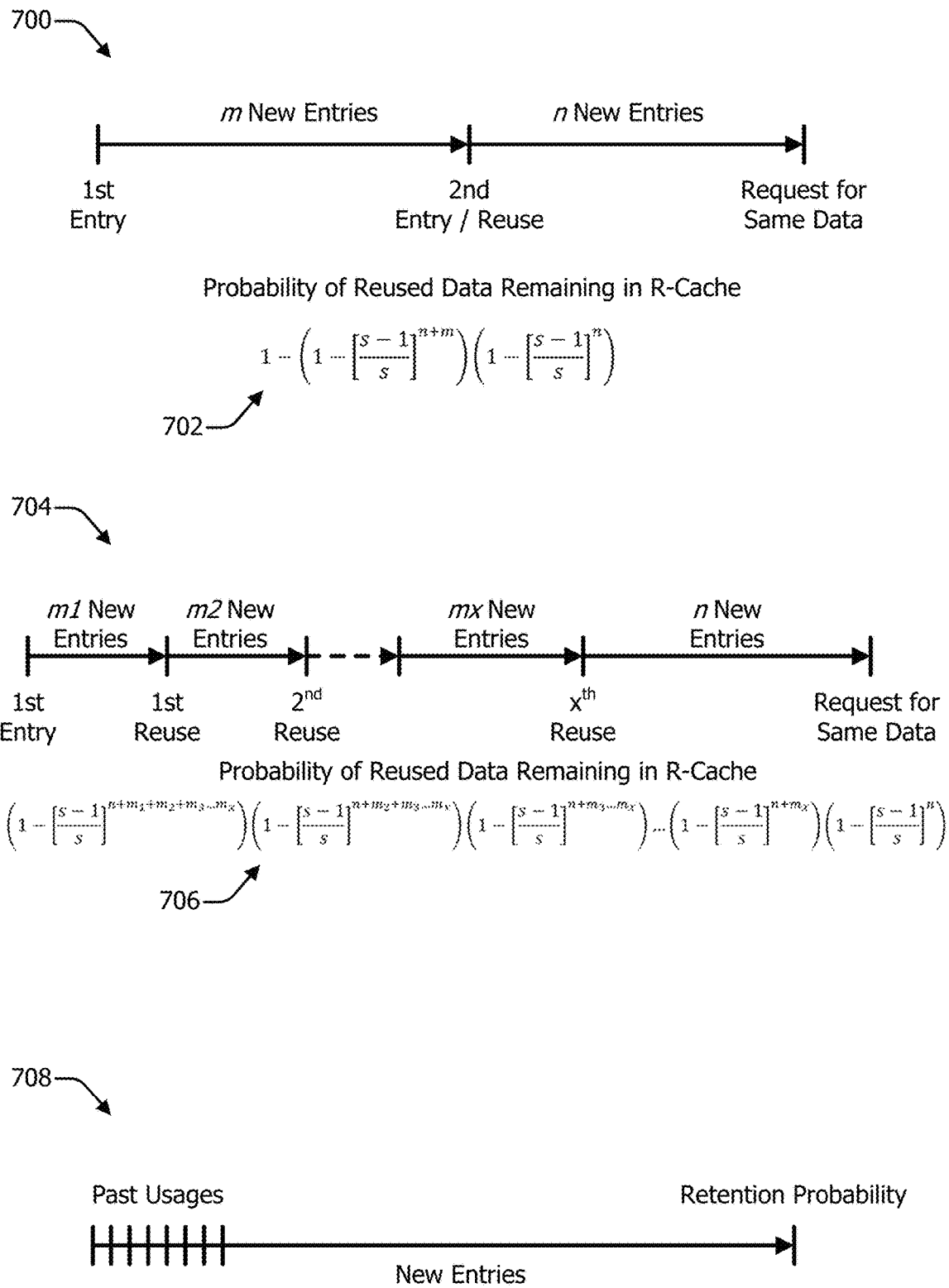
FIG. 7 illustrates example graphs of data retention enabled by various aspects of cache memory with randomized eviction.
Figure 8:
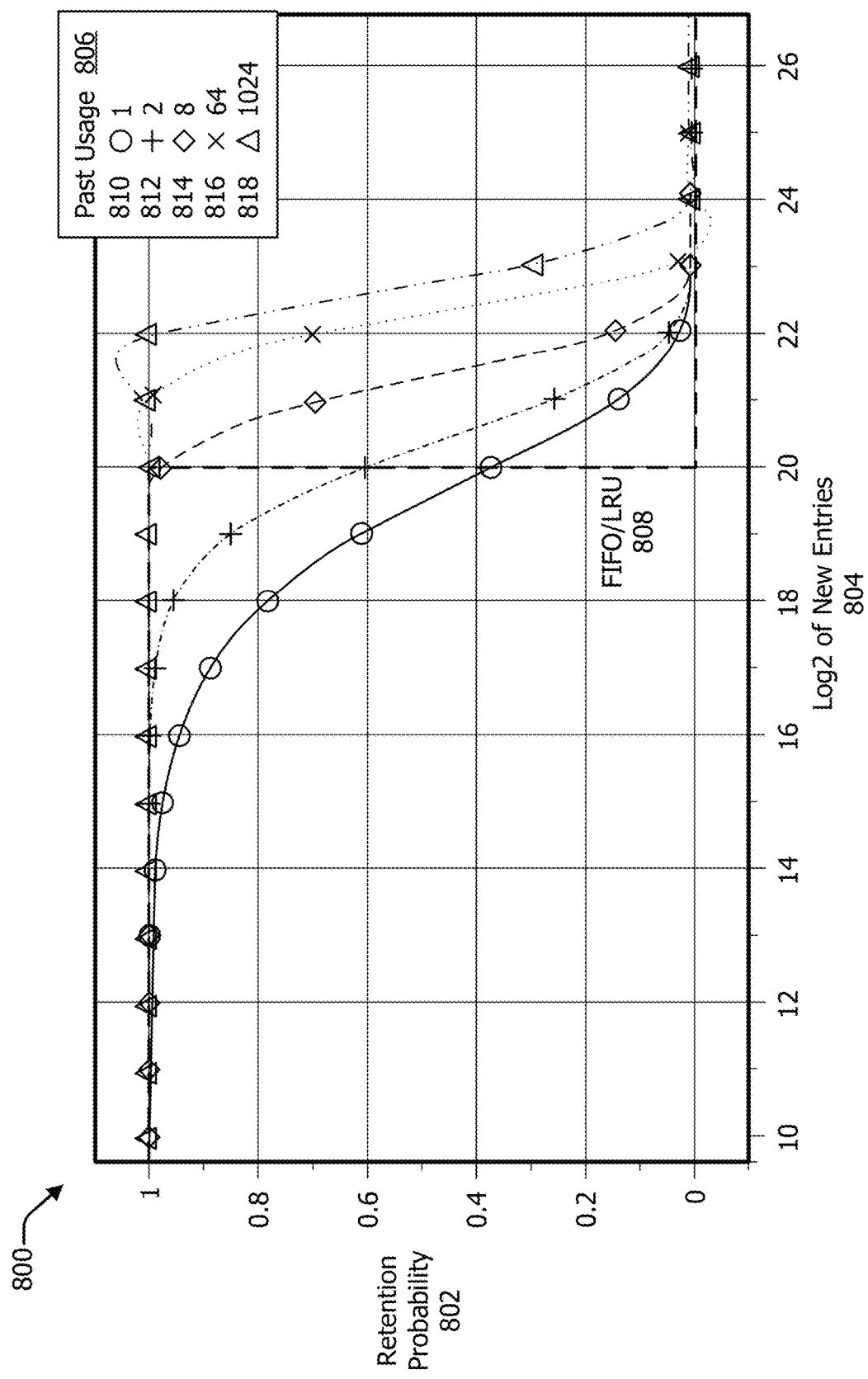
FIG. 8 illustrates an example graph of simulated data retention probabilities associated with a cache memory with randomized eviction.

FIG. 7 illustrates example graphs of data retention enabled by various aspects of cache memory with randomized eviction. In these examples, retention probability of particular data or a cache line of data in a cache memory with randomized eviction and multi-occupancy (e.g., r-cache) is described in the context of multiple reuses of the data. Generally, when data is reused from an r-cache, the same data can have multiple placements in the cache. As shown at 702, a fresh reuse of data will copy the data in a new location (2$^{nd}$ Entry/Reuse), in addition to the existing occupancy (1$^{st}$ Entry), and both copies of the data will have an increasing probability of eviction as new entries are made into the r-cache. In other words, the r-cache will start forgetting both copies of the data slowly with every subsequent entry made through randomized eviction and replacement. A data multiple reuse scenario may be generalized as shown in Equation 2 and at 702, in which the probability ($P_A$) of the 1$^{st}$ entry "A" remaining after a number of "m" of a cache size "s" and the probability (PB) of the 2$^{nd}$ entry "B" remaining after a number of "n" subsequent entries can be combined to provide a probability (P) of either copy of the data remaining in the r-cache.

$$P_A = \left[\frac{s-1}{s}\right]^n \text{ for } A, \quad P_B = \left[\frac{s-1}{s}\right]^{n+m} \text{ for } B \quad \text{Equation 2}$$

$$P = 1 - \left(1 - \left[\frac{s-1}{s}\right]^{n+m}\right)\left(1 - \left[\frac{s-1}{s}\right]^n\right) \text{ for } A \text{ and/or } B$$

Probability of Cache Line Remaining with Mulitple Reuse

In the context of the earlier example of an r-cache configured with 1024 cache lines ("s" equals 1024), if there were to close usages of a cache line, where "m" equals 10 before 1024 subsequent entries ("n" equals 1024), then the probability of at least one instance of the cache line remaining in the r-cache is 60% as shown in Equation 3.

$$P = 1 - \left(1 - \left[\frac{1023}{1024}\right]^{1034}\right)\left(1 - \left[\frac{1023}{1024}\right]^{1024}\right) = 0.6 = 60\% \quad \text{Equation 3}$$

Probability of Cache Line Remaining with One Reuse

Accordingly, the probability of the data existing or remaining in the r-cache after 1024 subsequent entries increases from 37% (one use) to 60% with the one reuse of the data. In other words, the r-cache may deem data important due to multiple usage, increasing the probability that the data is available in r-cache when such data would typically be evicted under a deterministic (e.g., LRU, FIFO) cache policy.

As shown at 704 of FIG. 7, the probability of a cache line remaining in the r-cache after multiple reuses of data and subsequent new entries may be generalized as Equation 4, which is also duplicated at 706 for convenience. In Equation 4, the probability (P) of a same data being available in the r-cache can be determined based on the respective probabilities of the same data remaining in the r-cache from a first entry or use (1$^{st}$ Entry) through an x$^{th}$ reuse of the data.

$$P = 1 - \left(1 - \left[\frac{s-1}{s}\right]^{n+m_1+m_2+m_3 \cdots m_x}\right)\left(1 - \left[\frac{s-1}{s}\right]^{n+m_2+m_3 \cdots m_x}\right)$$
$$\left(1 - \left[\frac{s-1}{s}\right]^{n+m_3 \cdots m_x}\right) \cdots \left(1 - \left[\frac{s-1}{s}\right]^{n+m_x}\right)\left(1 - \left[\frac{s-1}{s}\right]^n\right)$$

Equation 4

Probability of Cache Line Remaining with Mulitple Reuse

At 708, another graph represents the capability, or retention probability, of an r-cache to retain data with multiple past usages, which may be consecutive or proximate relative to a series of new entries. By way of example, consider FIG. 8, which illustrates at 800 a graph of retention probability for a cache with randomized eviction. In the example graph 800, retention probability 802 is plotted in relation to a number of new entries 804 (in Log2 scale) for various past usage values 806 versus a deterministic FIFO or LRU cache policy 808. With reference to a number of entries and cache size, the graph 800 may represent a simulation in the context of the previous example in which a size of a cache is 64 MB and each cache line is configured as 64B to provide 1024 cache lines.

As shown at 808, a FIFO/LRU cache policy will evict data from a deterministic cache after 1024 new data entries. In contrast with this deterministic limit at which requested data is no longer available, the aspects of cache memory with randomized eviction provide at least some probability after 1024 entries that requested data may still reside or exist in an r-cache. For example, and as noted herein, after one use of data (810), there is a 37% chance that this data resides in the r-cache after 1024 subsequent new entries of data. Based on an increased number of reuses, examples of which are provided at 806, the probabilities of requested data residing in cache further increase. As another example, with two uses of data (812), the probability of the data that is used twice being available after 1024 subsequent entries increases to 60%. Further, as shown with 8 uses (814), 64 uses (816), and 1024 uses (818), respective probabilities of the data that is reused being available after 1024 subsequent entries approaches 100%, which practically ensures a cache hit and avoids a latency-increasing cache miss to obtain the requested data from a lower performance memory. As such, aspects of cache memory with randomized eviction may preclude cache misses that are incurred by deterministic cache, particularly with reused data, which has even a higher probability to remain in an r-cache as described throughout this disclosure.

Example Methods

Example methods are described in this section with reference to the flow charts and flow diagrams of FIGS. 9-13. These descriptions reference components, entities, and other aspects depicted in FIGS. 1-8 by way of example only.

Figure 9:
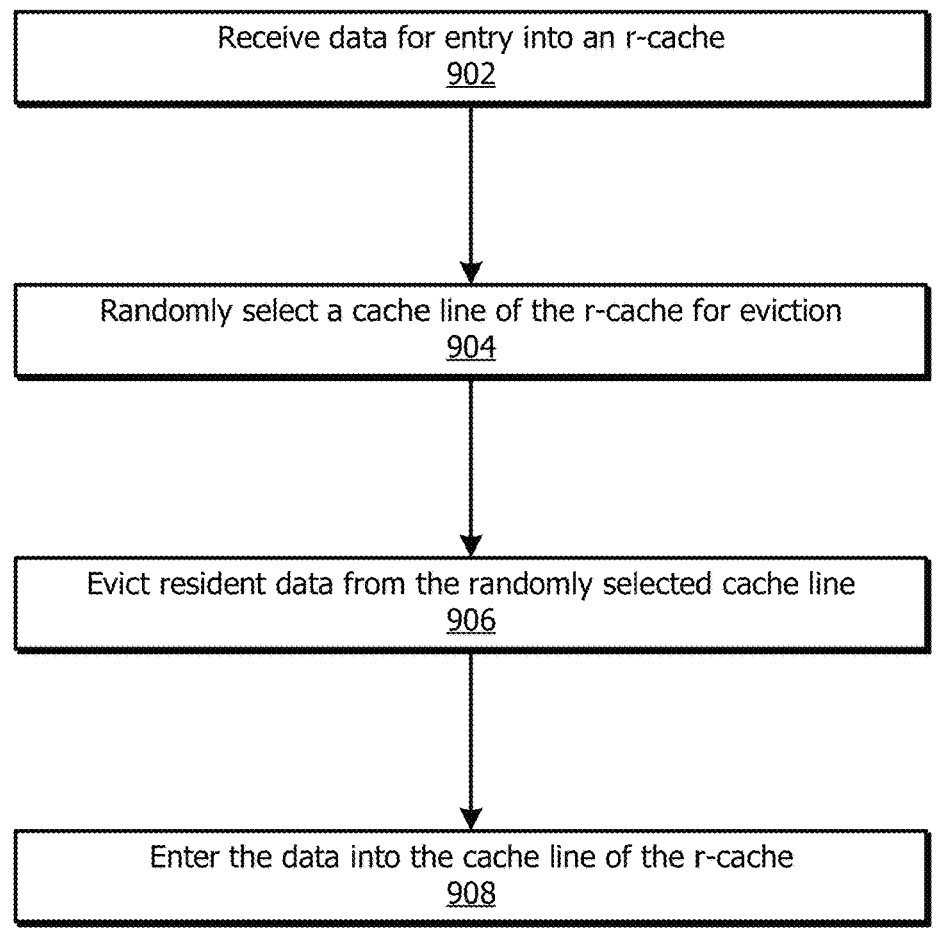
FIG. 9 illustrates an example method for evicting a randomly selected cache line in accordance with one or more aspects.

FIG. 9 depicts a flow diagram 900 of an example method for evicting a randomly selected cache line in accordance with one or more aspects. The flow diagram 900 includes operations 902 through 908, which may be performed using an r-cache 110 or randomized cache policy to implement aspects of cache memory with randomized eviction as described herein.

At 902, an r-cache receives data for entry into the r-cache. The data may include data useful to satisfy or complete a request for data received from a requestor associated with the r-cache. In some cases, the r-cache receives or obtains the data (e.g., new data) from another memory or another cache that is not present in another cache line of the r-cache. In other cases, the r-cache copies the data (e.g., reused data) from another cache line of the r-cache. For example, a data entry module or register of the r-cache may store data or a copy of the data provided by the r-cache to satisfy a request for data.

At 904, the r-cache randomly selects a cache line of the r-cache for eviction. The r-cache or a control logic of the r-cache (e.g., randomized evictor) may randomly select any cache line of the r-cache for eviction and/or replacement. For example, the control logic of the r-cache may use a random number generator or pseudorandom number generator to select a cache line for eviction. In some cases, the control logic or a randomized eviction policy of the r-cache is configured based on the type-configuration of the r-cache (e.g., N-way-set-associative configuration) such that cache lines for eviction are randomly selected from candidate cache lines to which new or reused data can be stored (e.g., any N lines of cache).

At 906, the r-cache evicts resident data from the randomly selected cache line. With the randomized selection and eviction, the evicted data may be discarded regardless of a time-based or deterministic metric associated with the data. In aspects, the data (e.g., copies of the data) may remain in other cache lines of the r-cache due to multi-occupancy. Accordingly, the r-cache may retain one or more copies of data (e.g., important data) used multiple times after having evicted one instance of the data from the randomly selected cache line.

At 908, the r-cache enters the data into the cache line of the r-cache. The control logic (e.g., data entry module) of the r-cache may enter new data or reused data into the randomly evicted cache line. When entering new data, the control logic of the r-cache may also determine a tag and/or information for the cache line of new data. Alternatively, when entering reused data from another cache line, the control logic of the r-cache may copy or use tag information that corresponds to the other cache line when determining a tag or other information for the cache line into which the control logic enters the reused data.

Figure 10:
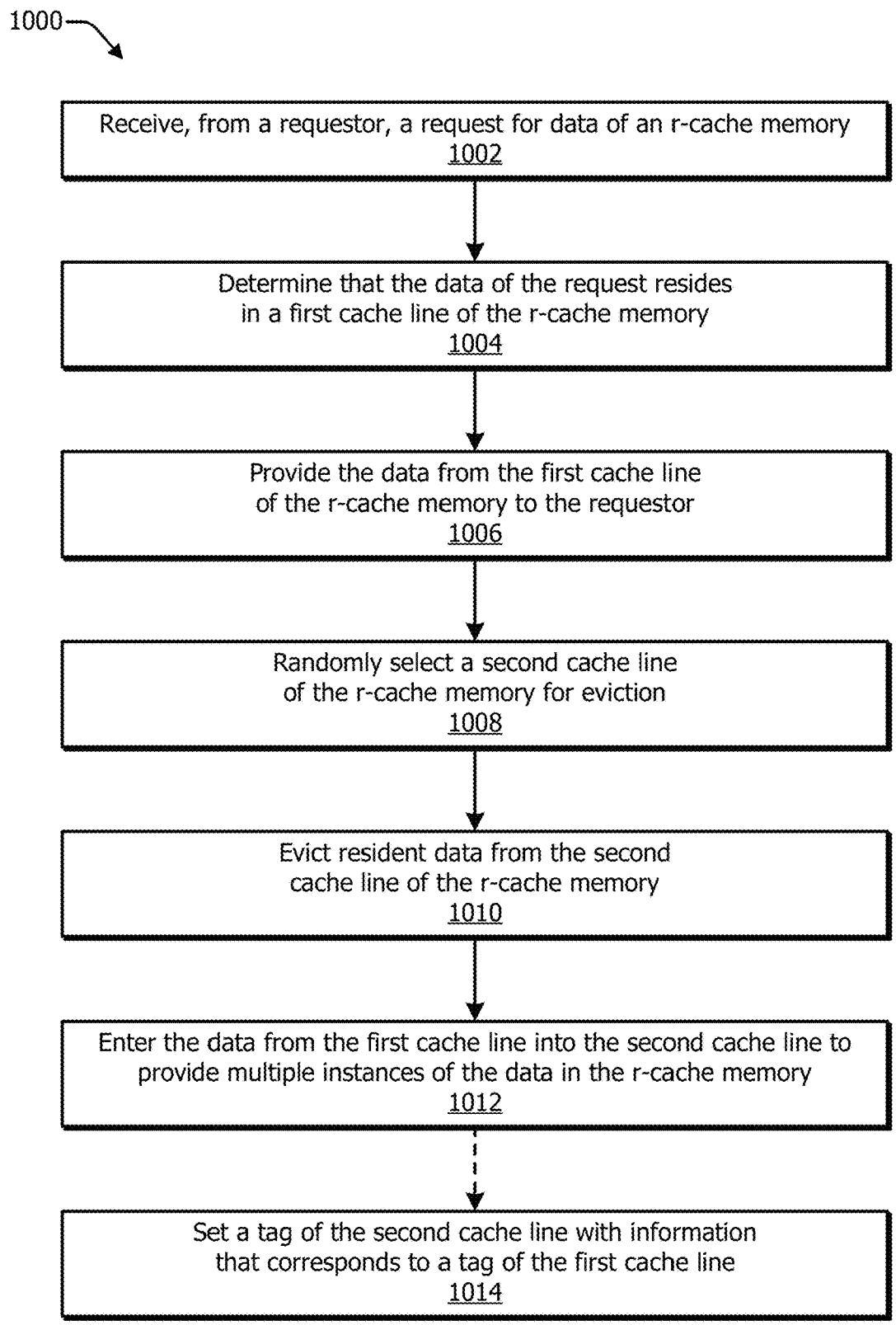
FIG. 10 illustrates an example method for entering data into a cache memory with randomized eviction.

FIG. 10 depicts a flow diagram 1000 of an example method for entering data into a cache memory with randomized eviction in accordance with one or more aspects. The flow diagram 1000 includes operations 1002 through 1014, which may be performed using an r-cache 110 or randomized cache policy to implement aspects of cache memory with randomized eviction as described herein.

At 1002, the r-cache receives, from a requestor, a request for data of the r-cache memory. The request for data may include address information for the data that corresponds to an address of the data in a backing memory or other memory location. The r-cache may receive the request from, as the requestor, any suitable entity that requests data and/or instructions from the r-cache or other caches. Examples of the requestor may include a processor, a processor core, a host, a client, an execution thread, program, application, and so forth.

At 1004, the r-cache determines that the data of the request resides in a first line of the r-cache memory. The control logic of the r-cache may search a tag array of the r-cache to determine that the data of the request resides or exists in at least one cache line of the r-cache (e.g., cache hit). In some cases, the data of the request may reside in multiple cache lines of the r-cache. In such cases, the control logic may cease to search the r-cache for the data of the request in response to finding the first cache line in which the data of the request resides.

At 1006, the r-cache provides the data from the first cache line of the r-cache memory to the requestor. Generally, the r-cache provides or returns the data stored in the first line of the r-cache to the requestor to satisfy or complete the request for data. In some cases, the r-cache provides the data from the first cache line to or through another cache memory (e.g., L1 cache, L2 cache) as an intermediate requestor to a processor. In aspects, the control logic of the r-cache may buffer or store the data, or a copy of the data, that is provided to the requestor for entry into the r-cache.

At 1008, the r-cache randomly selects a second cache line of the r-cache memory for eviction. The control logic of the r-cache (e.g., randomized evictor) may randomly select any cache line of the r-cache for eviction. In some aspects, the first cache line from which the data is obtained to satisfy the request for data is blocked or excluded from eviction. Alternatively, the first cache line from which the data is obtained is left as a candidate for randomized eviction.

At 1010, the r-cache memory evicts resident data from the second cache line of the r-cache memory. With the randomized selection and eviction, the evicted data may be discarded regardless of a time-based or deterministic metric associated with the data. In aspects, the evicted data (e.g., copies of the evicted data) may remain in other cache lines of the r-cache due to multi-occupancy. Accordingly, the r-cache may retain one or more copies of evicted data after having evicted one instance of the data from the randomly selected cache line.

At 1012, the r-cache memory enters the data from the first cache line into the second cache line to provide multiple instances of the data in the r-cache memory. The control logic of the r-cache (e.g., data entry module) may copy the data directly from the first cache line to the second cache line or buffer the data in an intermediate register. In some cases, the control logic includes a register capable of receiving new data from memory or reused data from cache lines of the r-cache.

At 1014, the r-cache memory sets a tag of the second cache line with information that corresponds to a tag of the first cache line of the r-cache memory. The control logic of the r-cache may copy or reuse tag information of the first cache line from which the data is copied to generate or determine tag information for the second cache line to which the data is copied. With multi-occupancy of same data in multiple cache lines of the r-cache, the multiple cache lines may have same tag and/or other information. In aspects, copying the tag information may preclude the requirement to generate or determine new tag information for the second cache line, which may improve cache memory performance.

Figure 11:
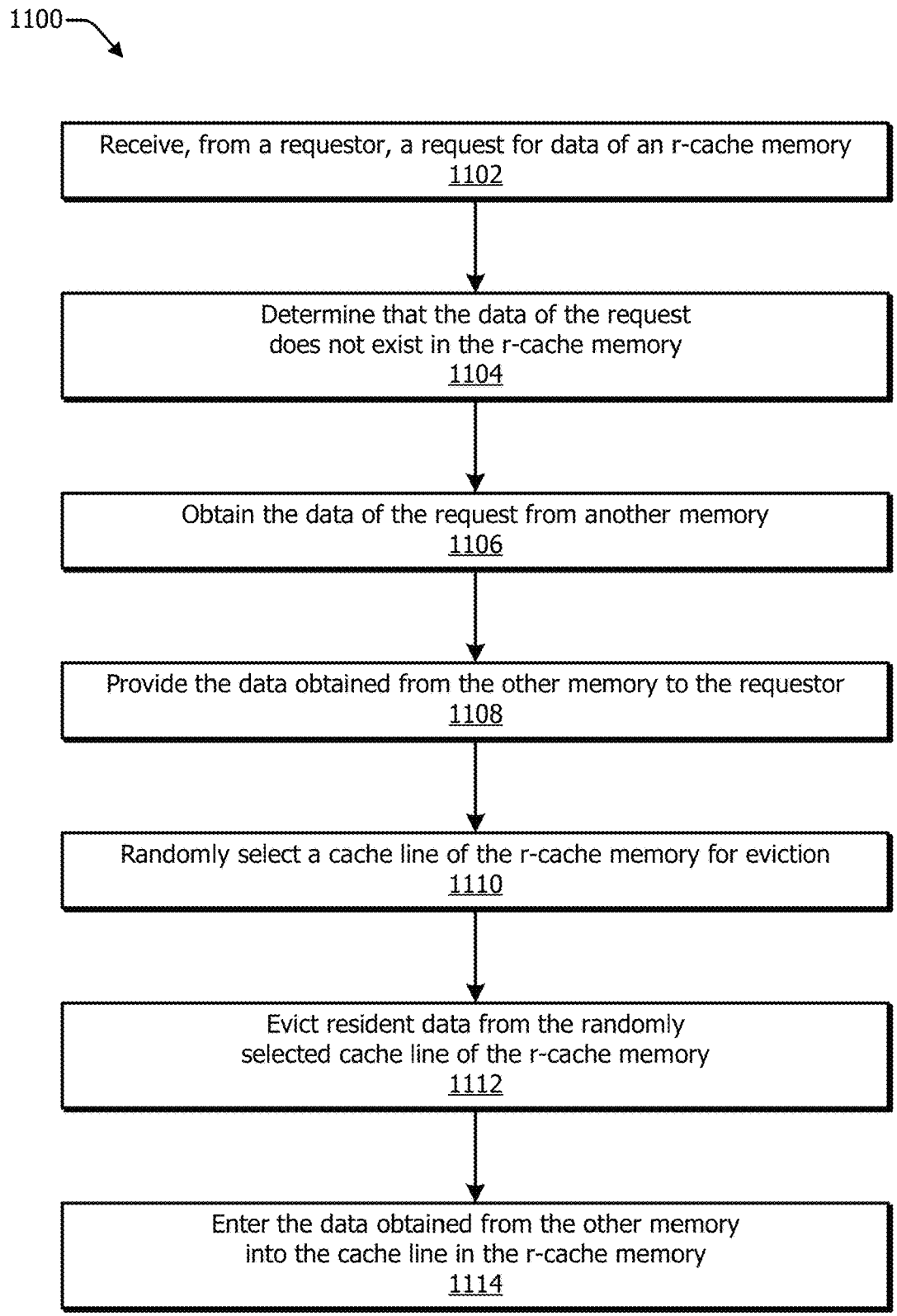
FIG. 11 illustrates an example method for reusing data of a cache memory with randomized eviction.

FIG. 11 depicts a flow diagram 1100 of an example method for reusing data of a cache memory with randomized eviction in accordance with one or more aspects. The flow diagram 1100 includes operations 1102 through 1114, which may be performed using an r-cache 110 to implement aspects of cache memory with randomized eviction as described herein.

At 1102, the r-cache receives, from a requestor, a request for data of the r-cache memory. The request for data may include address information for the data that corresponds to an address of the data in a backing memory or other memory location. The r-cache may receive the request from, as the requestor, any suitable entity that requests data and/or instructions from the r-cache or other caches. Examples of the requestor may include a processor, a processor core, a host, a client, an execution thread, program, application, and so forth.

At 1104, the r-cache determines that the data of the request does not exist in the r-cache memory. The control logic of the r-cache may search a tag array of the r-cache to determine that the data of the request does not reside or exist in any of the cache lines of the r-cache (e.g., cache miss). At 1106, the r-cache obtains the data of the request from another memory. For example, the r-cache may issue a request for the data to a memory controller or backing memory of a host device in which the r-cache is embodied.

At 1108, the r-cache provides the data obtained from the other memory to the requestor. Generally, the r-cache provides or returns the data obtained from the other memory to the requestor to satisfy or complete the request for data. In some cases, the r-cache provides the data from the other memory to or through another cache memory (e.g., L1 cache, L2 cache) as an intermediate requestor to a processor. In aspects, the control logic of the r-cache may buffer or store the data, or a copy of the data, that is provided to the requestor for entry into the r-cache.

At 1110, the r-cache randomly selects a cache line of the r-cache memory for eviction. The control logic of the r-cache (e.g., randomized evictor) may randomly select any cache line of the r-cache for eviction. To implement the randomized eviction, the control logic of the r-cache may include or be associated with a random number generator, a pseudorandom number generator, stream cipher logic, or the like.

At 1112, the r-cache memory evicts resident data from the randomly selected cache line of the r-cache memory. With the randomized selection and eviction, the evicted data may be discarded regardless of a time-based or deterministic metric associated with the data. In aspects, the evicted data (e.g., copies of the evicted data) may remain in other cache lines of the r-cache due to multi-occupancy. Accordingly, the r-cache may retain one or more copies of evicted data after having evicted one instance of the data from the randomly selected cache line.

At 1114, the r-cache memory enters the data obtained from the other memory into the cache line in the r-cache memory. The control logic of the r-cache (e.g., data entry module) may copy or write the data directly from the other memory (or source of the data) to second cache line or buffer the data in an intermediate register. In some cases, the control logic includes a register capable of receiving new data from the memory or reused data from other cache lines of the r-cache. Additionally, the r-cache memory may set a tag of the cache line with information that corresponds to the new data entered into the cache line of the r-cache.

Figure 12:
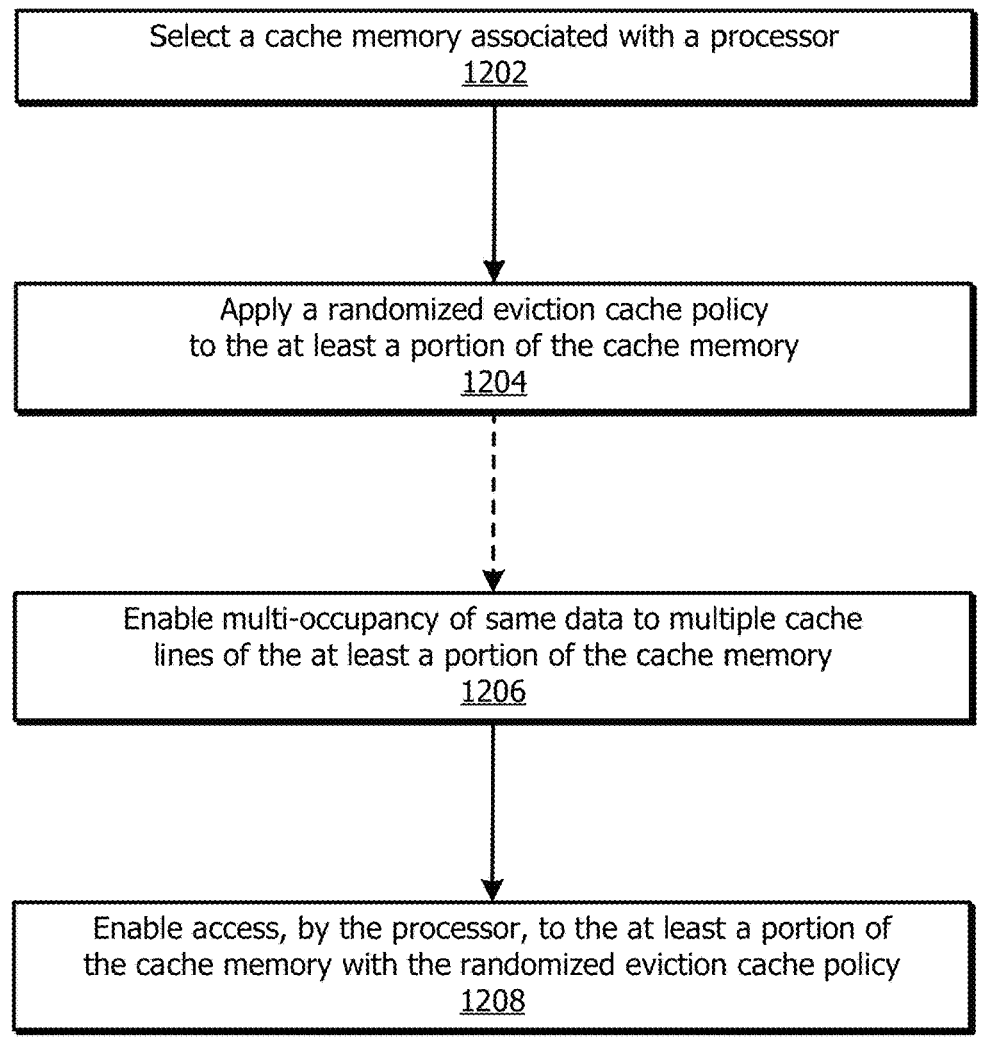
FIG. 12 illustrates an example method for applying randomized eviction cache policy to at least a portion of a cache memory.

FIG. 12 depicts a flow diagram 1200 of an example method for applying randomized eviction cache policy to at least a portion of a cache memory in accordance with one or more aspects. The flow diagram 1200 includes operations 1202 through 1208, which may be performed using an r-cache 110 and cache controller 112 to implement aspects of cache memory with randomized eviction as described herein.

At 1202, a cache controller selects a cache memory associated with a processor. The cache controller may select a dedicated cache of the processor (e.g., L2 cache) or a shared cache (e.g., L3 cache) that is accessible by the processor and at least one other processor (e.g., CPU, GPU), and/or multiple processor cores. The cache memory may be coupled with a memory controller and/or a backing memory of a host in which the cache memory is embodied. In aspects, the cache controller may receive a command from a processor, a host, an application, or a program to select the cache memory.

At 1204, the cache controller applies a randomized eviction cache policy to the at least a portion of the cache memory. In aspects, the cache controller may partition or section the cache memory prior to applying the randomized eviction cache policy to the at least a portion of the cache memory. For example, based on a non-sequential workload or an increase in cache misses for a deterministic cache, the cache controller may increase a relative size of the partition to which the randomized eviction cache policy is applied. In some cases, the cache controller may configure an entire cache memory for use with the randomized eviction cache policy, which may include reducing or eliminating a portion of cache memory operating under a deterministic cache policy (e.g., FIFO, LRU). Alternatively or additionally, the cache controller may receive a command from a processor, a host, an application, or a program to apply the randomized cache eviction policy to the at least a portion of the cache memory.

Optionally at 1206, the cache controller enables multi-occupancy of same data to multiple cache lines of the at least a portion of the cache memory. As described herein, enabling multi-occupancy enables the cache memory to store multiple copies of the same data to multiple respective cache lines. Thus, for data reused multiple times and/or entered into multiple cache lines of the cache memory, the cache memory may have an increased hit probability for at least one instance of the data remaining in the cache memory.

At 1208, the cache controller enables access, by the processor, to the at least a portion of the cache memory with the randomized eviction cache policy. In aspects, the cache memory or portion of cache memory operating with the randomized eviction cache policy may service requests from the processor, an intermediate requestor, or other processors. In aspects, the cache memory operating with the randomized eviction cache policy may have an increased probability of maintaining data that is used multiple times or repeatedly by the processor. In some cases, the cache memory operating with the randomized eviction cache policy may maintain data that would normally be discarded by a deterministic cache policy after a complete cycle of new cache line entries (e.g., 1024 entries) equal to a cache line size (e.g., 1024 cache lines) of the cache memory.

Figure 13:
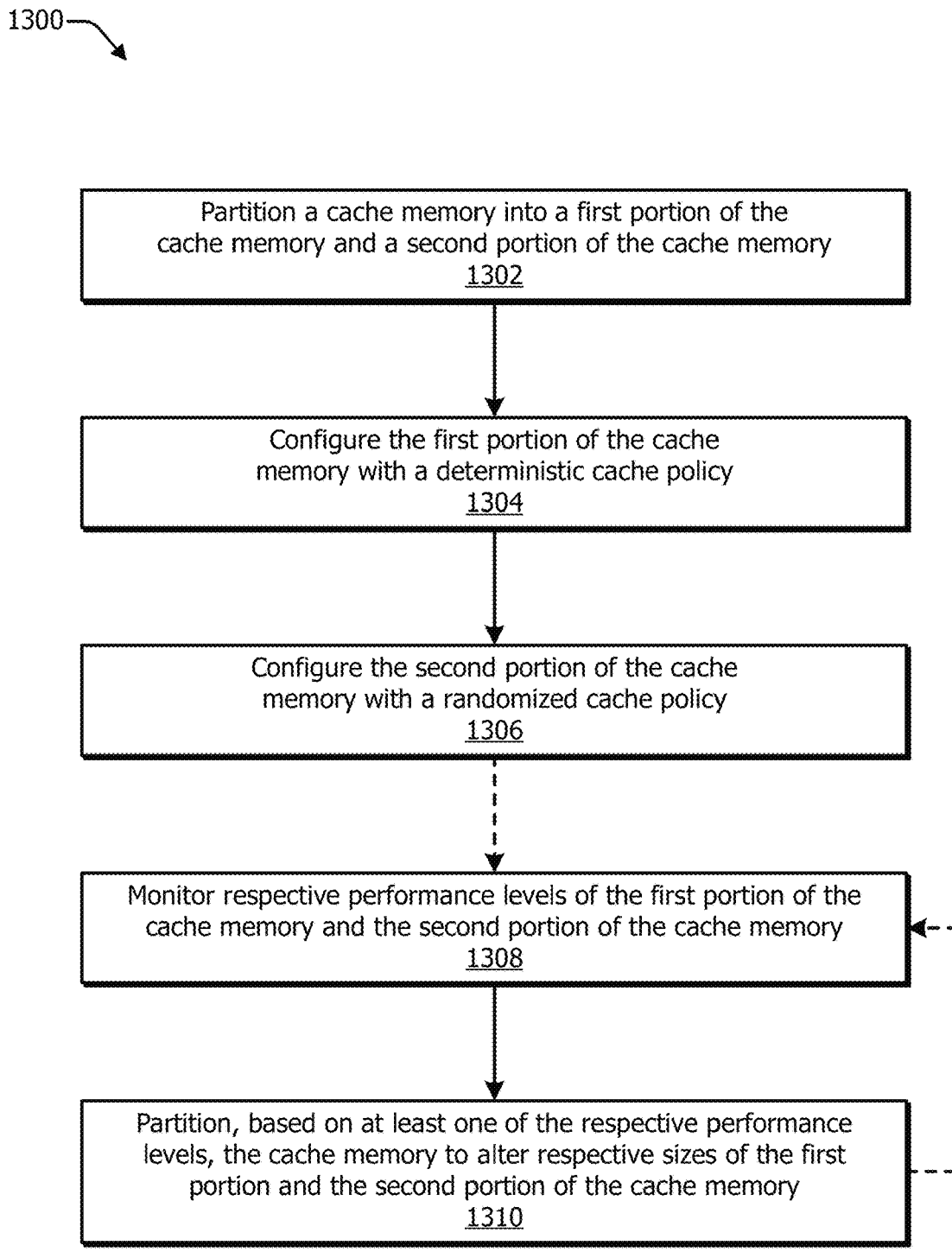
FIG. 13 illustrates an example of partitioning a cache memory for use with a randomized cache policy in accordance with one or more aspects.

FIG. 13 depicts a flow diagram 1300 of an example method for partitioning a cache memory for use with a randomized cache policy in accordance with one or more aspects. The flow diagram 1300 includes operations 1302 through 1310, which may be performed using an r-cache 110 and cache controller 112 to implement aspects of cache memory with randomized eviction as described herein.

At 1302, a cache controller partitions a cache memory into a first portion of the cache memory and a second portion of the cache memory. The cache controller may partition a dedicated cache of the processor (e.g., L2 cache) or a shared cache (e.g., L3 cache) that is accessible by the processor and at least one other processor (e.g., CPU, GPU), and/or multiple processor cores. The cache memory may also be coupled with a memory controller and/or a backing memory of a host in which the cache memory is embodied. In some aspects, the cache controller partitions the cache memory based on an expected workload (e.g., sequential or non-sequential workload) of the cache memory or a previously used partition configuration of the cache memory.

At 1304, the cache controller configures the first portion of the cache memory with a deterministic cache policy. For example, the cache controller configures the first portion of the cache memory with an LRU or FIFO caching policy to evict and replace cache lines or cache entries based on time in the cache, last usage, or the like.

At 1306, the cache controller configures the second portion of the cache memory with a randomized cache policy. For example, the cache controller configures the second portion of the cache with a randomized cache policy that includes randomized eviction and/or replacement of cache lines or cache entries. Additionally, the randomized cache policy may support multi-occupancy to enable same data to occupy multiple cache lines of the second portion of the cache. Alternatively or additionally, the cache controller may receive a command from a processor, a host, an application, or a program to configure the second portion of the cache memory with a randomized cache policy. In some cases, a command may indicate a size or amount of cache memory to partition as the second portion and the randomized cache policy to apply to the partitioned amount of cache memory.

Optionally at 1308, the cache controller monitors respective performance levels of the first portion of the cache memory and the second portion of the cache memory. For example, the cache controller may monitor respective cache hit/miss ratios of the first portion and the second portion of the cache memory. By so doing, the cache controller may determine relative levels of performance for the first portion and the second portion of the cache memory for a type of workload (e.g., sequential or non-sequential memory access) executing on one or more processors or requestors.

At 1310, the cache controller partitions, based on at least one of the respective performance levels, the cache memory to alter respective sizes of the first portion and the second portion of the cache memory. For example, the cache controller may alter or adjust the respective sizes of the portions of the cache memory to improve caching performance. In some cases, the cache controller increases the size of the second portion of the cache memory in response to determining that the portion of the cache memory operating with the randomized cache policy has a higher cache hit rate or higher cache hit/miss ration that the first portion of the cache operating with the deterministic cache policy. From operation 1310, the method 1300 may return to operation 1308 to monitor respective performance levels of the repartitioned portions of the cache memory. By so doing, the cache controller may implement iterative operations to evaluate and readjust an amount of the cache memory operating with the randomized cache policy to increase or optimize caching performance.

For the flow charts and flow diagrams described above, the orders in which operations are shown and/or described are not intended to be construed as a limitation. Any number or combination of the described process operations can be combined or rearranged in any order to implement a given method or an alternative method. Operations may also be omitted from or added to the described methods. Further, described operations can be implemented in fully or partially overlapping manners.

Aspects of these methods or operations may be implemented in, for example, hardware (e.g., fixed-logic circuitry or a processor in conjunction with a memory), firmware, or some combination thereof. The methods may be realized using one or more of the apparatuses, systems, or components shown in FIGS. 1-6, the components of which may be further divided, combined, rearranged, and so on. The devices, systems, and components of these figures generally represent firmware, such as executable-code or the actions thereof; hardware, such as electronic devices, packaged modules, IC chips, or circuits; software, such as processor-executable instructions; or a combination thereof. The illustrated apparatuses 100 and components shown at 200, 202, 204, 206, 300, 302, 400, and/or 500, include, for instance, a processor 106 (or processor core), a cache 108, an r-cache 110, a shared cache 308, a cache controller 112, a memory controller 114, an interconnect 116, and/or a backing memory 118. An apparatus or a host device 104 can include a processor 106, a cache 108, a r-cache 110, a cache controller 112, and a memory controller 114. A memory controller may include an r-cache 110, a cache controller 112 (or interface to a cache controller 112), and an interconnect 116 to a backing memory 118. Thus, these figures illustrate some of the many possible systems or apparatuses capable of implementing the described methods and operations.

In the context of the present disclosure, computer-readable media includes both non-transitory computer storage media and communication media, including any medium that facilitates transfer of a computer program (e.g., an application) or data from one entity to another. Non-transitory computer storage media can be any available medium accessible by a computer, such as memory, cache, RAM, SRAM, DRAM, ROM, Flash, EEPROM, optical media, and magnetic media.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

CONCLUSION

Although aspects of cache memory with randomized eviction have been described in language specific to certain features and/or methods, the subject matter of the appended claims is not necessarily limited to the specific features or methods described. Rather, the specific features and methods are disclosed as a variety of example implementations of cache memory with randomized eviction.

What is claimed is:
1. An apparatus comprising:
  a memory array configured as a cache memory having multiple cache lines;
  an interface between the cache memory and at least one processor; and a cache controller coupled to the cache memory, the cache controller configured to:
configure at least a portion of the cache memory to evict data from the multiple cache lines by randomly selecting ones of the multiple cache lines from which to evict the data;
enable multi-occupancy for the at least a portion of the cache memory; and
configure the at least a portion of the cache memory to enter other data requested by the processor in the randomly selected cache lines from which the data is evicted, the other data obtained from others of the multiple cache lines of the cache memory.

2. The apparatus as recited in claim 1, wherein enabling the multi-occupancy for the at least a portion of the cache memory permits same data to occupy at least two of the multiple cache lines of the at least a portion of the cache memory.

3. The apparatus as recited in claim 1, wherein the cache controller configures the at least a portion of the cache memory by applying a cache policy with randomized eviction or multi-occupancy to the at least a portion of the cache memory.

4. The apparatus as recited in claim 3, wherein:
the at least a portion of the cache memory is a first portion of the cache memory, the cache policy is a first cache policy, and the cache controller is further configured to:
partition the cache memory into the first portion of cache memory to which the first cache policy is applied;
partition the cache memory into a second portion of cache memory; and
apply a second cache policy to the second portion of the cache memory, the second cache policy being a deterministic cache policy.

5. The apparatus as recited in claim 4, wherein:
the first cache policy is a randomized eviction cache policy or a randomized cache policy; or
the second cache policy is a First In, First Out (FIFO) cache policy or a Least Recently Used (LRU) cache policy.

6. The apparatus as recited in claim 4, wherein the cache controller is further configured to:
monitor a respective performance level of the first portion of the cache memory or the second portion of the cache memory; and
alter a first size of the first portion of the cache memory or a second size of the second portion of the cache memory based on at least one of the respective performance levels of the first portion of the cache memory or the second portion of the cache memory.

7. The apparatus as recited in claim 4, wherein the cache controller is further configured to:
monitor a respective performance level of the first portion of the cache memory or the second portion of the cache memory; and
alter the first cache policy applied to the first portion of the cache memory based on the respective performance level of the first portion of cache memory; or
alter the second cache policy applied to the second portion of the cache memory based on the respective performance level of the second portion of cache memory.

8. The apparatus as recited in claim 1, wherein:
the cache controller is further configured to receive a command from a host to partition the cache memory into at least the first portion of cache memory.

9. The apparatus as recited in claim 8, wherein:
the command received from the host to partition the cache memory into at least the first portion of cache memory indicates at least one of:
a first size of the first portion of the cache memory;
a second size of the second portion of the cache memory;
a first cache policy to apply to the first portion of the cache memory; or
a second cache policy to apply to the second portion of the cache memory.

10. The apparatus as recited in claim 1, wherein:
the at least one processor comprises at least two processors; and
the cache memory is a shared cache memory that is accessible by the at least two processors.

11. The apparatus as recited in claim 10, wherein:
one of the at least two processors is a processor or processor core of a graphics processing unit.

12. The apparatus as recited in claim 1, wherein the other data includes at least one tag bit associated with the other of the multiple cache line from which the other data is obtained, and the cache controller is further configured to associate the at least one tag bit with the randomly selected cache line to which the other data is entered.

13. A method comprising:
configuring at least a portion of a cache memory having multiple cache lines to evict data from the multiple cache lines by randomly selecting ones of the multiple cache lines from which to evict the data;
enabling multi-occupancy for the at least a portion of the cache memory;
configuring the at least a portion of the cache memory to service requests of a processor coupled to the cache memory for other data, at least some of the other data entered into the randomly selected cache lines for eviction obtained from others of the multiple cache lines of the cache memory; and
configuring the at least a portion of the cache memory to enter the other data requested by the processor in the randomly selected cache lines from which the data is evicted.

14. The method as recited in claim 13, wherein enabling the multi-occupancy for the at least a portion of the cache memory permits same data to occupy at least two of the multiple cache lines of the at least a portion of the cache memory.

15. The method as recited in claim 13, further comprising applying a cache policy to configure the at least a portion of the cache memory to:
evict the data from the multiple cache lines by randomly selecting the ones of the multiple cache lines from which to evict the data; or
enable the multi-occupancy for the at least a portion of the cache memory.

16. The method as recited in claim 15, wherein:
the at least a portion of the cache memory is a first portion of the cache memory, the cache policy is a first cache policy, and the method further comprises:
partitioning the cache memory into the first portion of cache memory to which the first cache policy is applied;
partitioning the cache memory into a second portion of cache memory; and
applying a second cache policy to the second portion of the cache memory, the second cache policy being a deterministic cache policy.

17. The method as recited in claim 16, wherein:
the first cache policy is a randomized eviction cache policy or a randomized cache policy; or
the second cache policy is a First In, First Out (FIFO) cache policy or a Least Recently Used (LRU) cache policy.

18. The method as recited in claim 16, further comprising:
monitoring a respective performance level of the first portion of the cache memory or the second portion of the cache memory; and
altering a first size of the first portion of the cache memory or a second size of the second portion of the cache memory based on at least one of the respective performance levels of the first portion of the cache memory or the second portion of the cache memory.

19. The method as recited in claim 16, further comprising:
monitoring a respective performance level of the first portion of the cache memory or the second portion of the cache memory; and
altering the first cache policy applied to the first portion of the cache memory based on the respective performance level of the first portion of cache memory; or
altering the second cache policy applied to the second portion of the cache memory based on the respective performance level of the second portion of cache memory.

20. The method as recited in claim 13, further comprising:
receiving a command from a host to partition the cache memory into at least the first portion of cache memory; and
partitioning the at least a portion of the cache memory from the cache memory.

21. The method as recited in claim 20, wherein:
the command received from the host to partition the cache memory into at least the first portion of cache memory indicates at least one of:
a first size of the first portion of the cache memory;
a second size of the second portion of the cache memory;
a first cache policy to apply to the first portion of the cache memory; or
a second cache policy to apply to the second portion of the cache memory.

22. The method as recited in claim 13, wherein:
the at least one processor comprises at least two processors; and
the cache memory is a shared cache memory that is accessible by the at least two processors.

23. The method as recited in claim 13, wherein:
one of the at least two processors is a processor or processor core of a graphics processing unit.

24. The method as recited in claim 13 wherein the other data includes at least one tag bit associated with the other of the multiple cache line from which the other data is obtained, and the method further comprises associating the at least one tag bit with the randomly selected cache line to which the other data is entered.

25. A system comprising:
a processor;
a memory controller configured to couple the system to a backing memory;
a memory array configured as a cache memory having multiple cache lines;
a first interface between the cache memory and the processor;
a second interface between the cache memory and the memory controller; and
a cache controller coupled to the cache memory, the cache controller configured to:
configure at least a portion of the cache memory to evict data from the multiple cache lines by randomly selecting ones of the multiple cache lines from which to evict the data;
enable multi-occupancy for the at least a portion of the cache memory;
configure the at least a portion of the cache memory to enter other data requested by the processor in the randomly selected cache lines from which the data is evicted, the other data obtained from others of the multiple cache lines of the cache memory.

26. The system as recited in claim 25, wherein the cache controller configures the at least a portion of the cache memory by applying a cache policy with randomized eviction or multi-occupancy to the at least a portion of the cache memory.

27. The system as recited in claim 26, wherein:
the at least a portion of the cache memory is a first portion of the cache memory, the cache policy is a first cache policy, and the cache controller is further configured to:
partition the cache memory into the first portion of cache memory to which the first cache policy is applied;
partition the cache memory into a second portion of cache memory; and
apply a second cache policy to the second portion of the cache memory, the second cache policy being a deterministic cache policy.

28. The system as recited in claim 27, wherein:
the first cache policy is a randomized eviction cache policy or a randomized cache policy; or
the second cache policy is a First In, First Out (FIFO) cache policy or a Least Recently Used (LRU) cache policy.

29. The system as recited in claim 27, wherein the cache controller is further configured to:
monitor a respective performance level of the first portion of the cache memory or the second portion of the cache memory; and
alter a first size of the first portion of the cache memory or a second size of the second portion of the cache memory based on at least one of the respective performance levels of the first portion of the cache memory or the second portion of the cache memory.

30. The system as recited in claim 27, wherein the cache controller is further configured to:
monitor a respective performance level of the first portion of the cache memory or the second portion of the cache memory; and
alter the first cache policy applied to the first portion of the cache memory based on the respective performance level of the first portion of cache memory; or
alter the second cache policy applied to the second portion of the cache memory based on the respective performance level of the second portion of cache memory.

31. The system as recited in claim 25, wherein the other data includes at least one tag bit associated with the other of the multiple cache line from which the other data is obtained, and the cache controller is further configured to associate the at least one tag bit with the randomly selected cache line to which the other data is entered.

* * * * *